US007532987B2

(12) United States Patent
Matsubayashi et al.

(10) Patent No.: US 7,532,987 B2
(45) Date of Patent: May 12, 2009

(54) FUEL-CELL POWER GENERATION SYSTEM AND CONTROL METHOD THEREFOR

(75) Inventors: Shigeaki Matsubayashi, Ikoma (JP);
Masami Funakura, Neyagawa (JP);
Tsuneko Imagawa, Hirakata (JP);
Masataka Ozeki, Izumi (JP); Yoshikazu Tanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 793 days.

(21) Appl. No.: 10/925,939

(22) Filed: Aug. 26, 2004

(65) Prior Publication Data

US 2005/0048337 A1   Mar. 3, 2005

(30) Foreign Application Priority Data

Aug. 28, 2003   (JP)   ............................. 2003-304538
Feb. 27, 2004   (JP)   ............................. 2004-054098

(51) Int. Cl.
*G06F 17/00* (2006.01)
*G06F 19/00* (2006.01)
(52) U.S. Cl. ............................. 702/60; 702/61; 702/63; 429/12; 429/13; 429/22; 700/288
(58) Field of Classification Search .................. 702/60, 702/61, 63
See application file for complete search history.

(56) References Cited

U.S. PATENT DOCUMENTS

| 6,510,369 | B1 * | 1/2003 | Lacy ........................... 700/295 |
| 6,581,015 | B2 * | 6/2003 | Jones et al. .................... 702/60 |
| 6,925,361 | B1 * | 8/2005 | Sinnock ....................... 700/286 |
| 2003/0143447 | A1 * | 7/2003 | Akimoto et al. ................ 429/23 |
| 2003/0167105 | A1 * | 9/2003 | Colborn ....................... 700/295 |
| 2004/0005488 | A1 * | 1/2004 | Faris et al. ..................... 429/23 |
| 2004/0219398 | A1 * | 11/2004 | Calhoon ....................... 429/13 |
| 2004/0253489 | A1 * | 12/2004 | Horgan et al. ................. 429/13 |
| 2005/0142405 | A1 * | 6/2005 | Nagamitsu et al. ............. 429/22 |
| 2006/0188764 | A1 * | 8/2006 | Nakamura et al. ............. 429/23 |

FOREIGN PATENT DOCUMENTS

| JP | 2002-291161 | 10/2002 |
| JP | 2003-61245 | 2/2003 |
| JP | 2003-134665 | 5/2003 |

OTHER PUBLICATIONS

Translation of JP 2003-134665.*

* cited by examiner

*Primary Examiner*—Hal D Wachsman
(74) *Attorney, Agent, or Firm*—Wenderoth, Lind & Ponack, L.L.P.

(57) ABSTRACT

A fuel-cell power generation system includes a fuel-cell power generator, a power measurement section for measuring an actual power-consumption value in a household appliance, and a power-consumption estimation section for estimating a future power-consumption value over a given time-period after a given time point, in accordance with the actual power-consumption value measured by the power measurement section. Moreover, the system includes a power-generation instruction section for determining the need of startup/stop of the fuel-cell power generator in accordance with the estimated power-consumption value from the power-consumption estimation section.

12 Claims, 13 Drawing Sheets

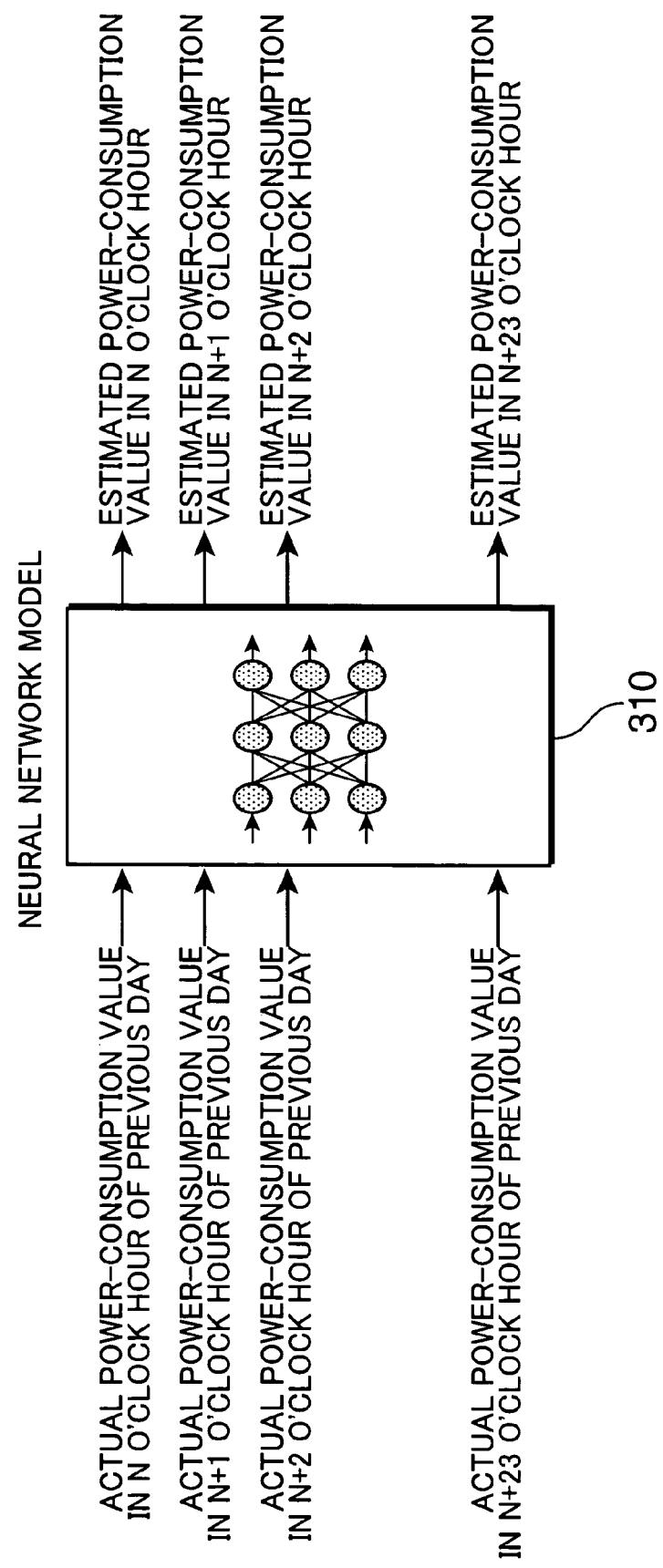

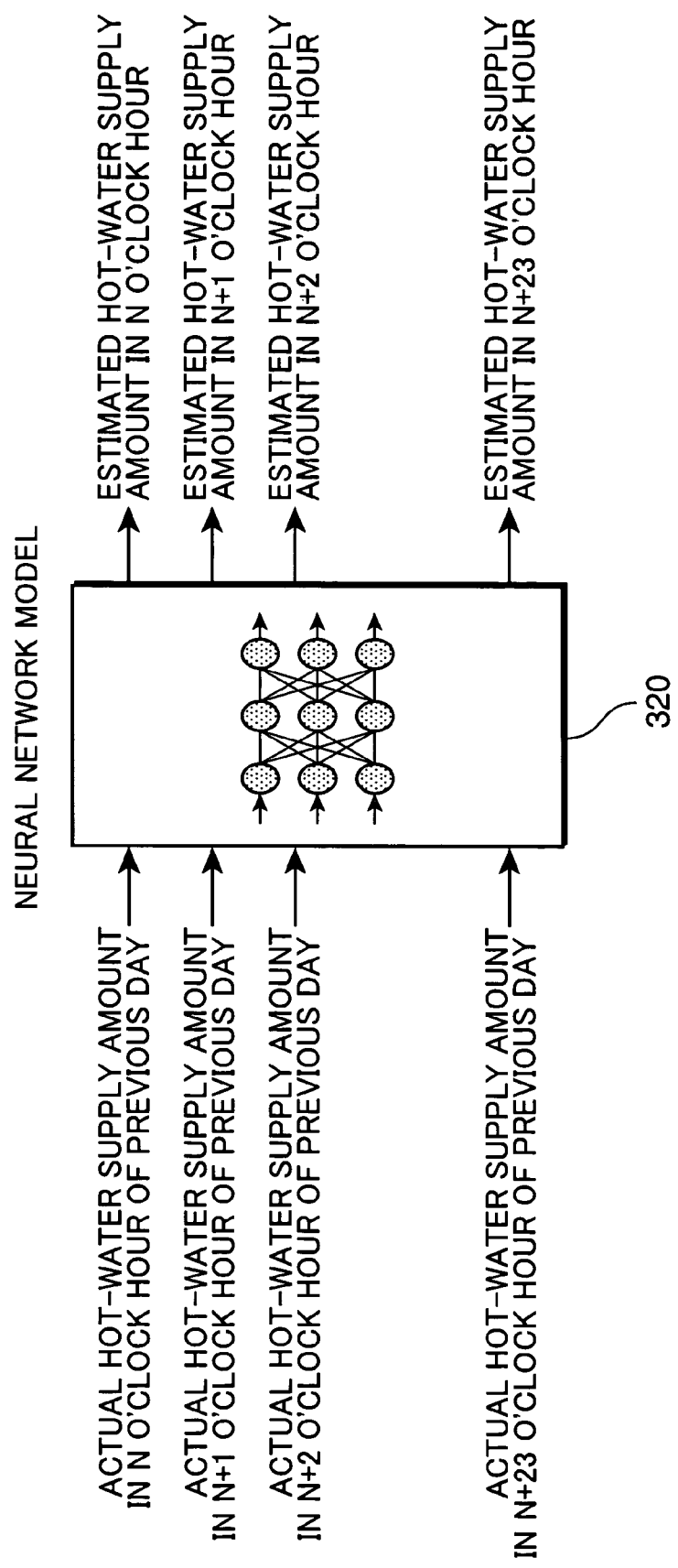

FUEL-CELL POWER GENERATION SYSTEM AND CONTROL METHOD THEREFOR

This application is based on Japanese patent application serial No. 2003-304538, filed in Japan Patent Office on Aug. 28, 2003 and serial No. 2004-054098, filed in Japan Patent Office on Feb. 27, 2004, the contents of which are hereby incorporated by reference.

BACKGROUND OF THE INVENTION

1. Field of the Invention

The present invention relates to a fuel-cell power generation system comprising a fuel-cell power generator adapted to generate electricity to be supplied to various electrical appliances. The present invention also relates to a control method for such a fuel-cell power generation system.

2. Description of the Related Art

There has heretofore been known a fuel-cell power generator designed to operate fuel cells to generate electricity using fuel gas so as to supply electric power and hot water. In view of power generation efficiency, it is desired to operate the fuel cells to generate electricity equal to that to be consumed by electrical household appliances. Thus, it is requited to monitor or measure the power consumption of the appliances and control the power generation or output power of the fuel cells in response to the measured value. However, the fundamental characteristics of the fuel cells utilizing the chemical reaction between oxygen and hydrogen obtained by reforming city gas or the like are likely to cause difficulties in changing the output power in conformity to sharp or rapid changes in power consumption. In this case, if the output power of the fuel-cell power generator is controlled in accordance with only simple or usual changes in power consumption, the generated output will be supplied with a certain delay relative to power consumption to cause deterioration in energy saving performance due to, for example, lowered utilization factor of the generated output at the initiation of power usage and surplus in the generated output at the termination of the power usage. Therefore, an adequate energy saving performance has to be assured by avoiding the response to rapid changes in power consumption and frequent startup/stop operations.

For this purpose, one conventional fuel-cell power generator is designed such that a plurality of time zones are set up according to the characteristic of changes in power consumption, and the output power of fuel cells is controlled by factors consisting of a change rate of power consumption, a dead time and an offset relative to an actual power consumption, which are defined in each of the time zones, so as to prevent the response to rapid changes in power consumption and frequent startup/stop operations (see, for example, Japanese Patent Laid-Open Publication No. 2002-291161: Patent Publication 1).

Another conventional fuel-cell power generator is designed such that power consumption is estimated in advance by simulation, the output power of fuel cells is efficiently controlled according to the estimated values (see, for example, Japanese Patent Laid-Open Publication No. 2003-61245: Patent Publication 2).

However, the above conventional fuel-cell power generators cannot be adaptively controlled in conformity to various electricity loads different in each of the homes. Specifically, in the above Patent Publication 1, it is practically difficult to calculate optimal values of the change rate, dead time and offset to be determined in advance for each of the homes, because such factors are originally varied between the homes. Moreover, it cannot cope with the situation where power consumption is largely varied due to changes in season, life style, use condition of appliances or the like.

In the above Patent Publication 2, while electricity loads are estimated by simulation in a load estimation step, such estimated values can be created only if there is previous data obtained under environmental conditions equivalent to those as the basis of the simulation. In addition, while characteristic data of fuel cells are required to perform the simulation, the characteristics of fuel cells would be varied between homes, and thereby adequate estimated values cannot be practically created. Thus, as with the generator in Patent Publication 1, it is difficult for the generator in Patent Publication 2 to estimate power consumption to be varied between homes.

SUMMARY OF THE INVENTION

In view of the above problems, it is therefore an object of the present invention to provide a fuel-cell power generation system and a control method therefor, capable of estimating power consumption that varies between homes so as to efficiently control the output power therefrom to achieve a desirable energy saving performance.

In order to achieve the above object, the present invention provides a fuel-cell power generation system including a fuel-cell power generator adapted to generate electricity to be supplied to an electrical appliance. The fuel-cell power generation system comprises power measurement means for measuring an actual power-consumption value in the appliance, power-consumption estimation means for estimating a future power-consumption value over a given time-period after a given time point, in accordance with the actual power-consumption value from the power measurement means, and operation control means for controlling the operation of the fuel-cell power generator in accordance with the estimated power-consumption value from the power-consumption estimation means.

According to the above fuel-cell power generation system including a fuel-cell power generator adapted to generate electricity to be supplied to an electrical appliance, an actual power-consumption value in the electrical appliance is measured, and a future power-consumption value over a given time-period after a given time point is estimated in accordance with the measured actual power-consumption value. Then, the operation of the fuel-cell power generator is controlled in accordance with the estimated power-consumption value.

In the fuel-cell power generation system of the present invention, the power-consumption estimation means may include estimation-reference-data holding means for holding the actual power-consumption value measured before the given time point, as estimation reference data, neuro-model-based estimation means for estimating the future power-consumption value over the given time-period after the given time point, according to a neural network model using the estimation reference data as an input value, learning-control-reference-data holding means for holding an actual power-consumption value measured by the power measurement means in the same time zone as that of the estimated power-consumption value, as learning-control reference data, and neuro-model learning-control means for learning-controlling the neural network model in accordance with the learning-control reference data and the estimated power-consumption value.

According to this power-consumption estimation means, the actual power-consumption value measured before the given time point is held as estimation reference data, and the future power-consumption value over the given time-period after the given time point is estimated by the neural network model using the estimation reference data as an input value. Then, an actual power-consumption value measured by the power measurement means in the same time zone as that of the estimated power-consumption value is held as learning-control reference data, and a learning control is performed for the neural network model in accordance with the learning-control reference data and the estimated power-consumption value.

In the fuel-cell power generation system of the present invention, when the estimated power-consumption value provided from the power-consumption estimation means is greater than a given lower limit successively for a given time-period, the operation control means may be operable to initiate a startup operation of the fuel-cell power generator at a time point going back from the time point when the estimated power-consumption value will initially become greater than the given lower limit, by a time-period necessary for the activation of the fuel-cell power generator.

According to this operation control means, the estimated power-consumption value is greater than a given lower limit successively for a given time-period, the startup operation of the fuel-cell power generator will be initiated at a time point going back from the time point when the estimated power-consumption value will initially become greater than the given lower limit, by a time-period necessary for the activation of the fuel-cell power generator.

In the fuel-cell power generation system of the present invention, when the estimated power-consumption value provided from the power-consumption estimation means is less than a given lower limit successively for a given time-period, the operation control means may be operable to initiate a stop operation of the fuel-cell power generator at the time point when the estimated power-consumption value will initially become less than the given lower limit.

According to this operation control means, when the estimated power-consumption value is less than a given lower limit successively for a given time-period, the stop operation of the fuel-cell power generator will be initiated at the time point when the estimated power-consumption value will initially become less than the given lower limit.

In the fuel-cell power generation system of the present invention, when the actual power-consumption value in the electrical appliance is greater than an upper limit of the output power of the fuel-cell power generator, the power-consumption measurement means may be operable to measure the upper limit as a substitute for the actual power-consumption value.

According to this power-consumption measurement means, when the actual power-consumption value in the electrical appliance is greater than an upper limit of the output power of the fuel-cell power generator, the upper limit is measured as a substitute for the actual power-consumption value.

The fuel-cell power generation system of the present invention may further include hot-water-supply measurement means for measuring an actual hot-water supply amount from a hot-water appliance adapted to supply hot water using the fuel-cell power generator, and hot-water-supply-amount estimation means for estimating a future hot-water supply amount over a given time-period after a given time point, in accordance with the actual hot-water supply amount measured by the hot-water measurement means. In this case, the operation control means may be operable to control the operation of the fuel-cell power generator in accordance with the estimated power-consumption value from the power-consumption estimation means and the estimated hot-water supply amount from the hot-water-amount estimation means.

According to this fuel-cell power generation system including the fuel-cell power generator adapted to generate electricity to be supplied to an electrical appliance, an actual power-consumption value in the electrical appliance is measured, and a future power-consumption value over a given time-period after a given time point is estimated in accordance with the measured actual power-consumption value. Further, an actual hot-water supply amount from a hot-water appliance is measured, and a future hot-water supply amount over a given time-period after a given time point is estimated in accordance with the measured actual hot-water supply amount, and the operation of the fuel-cell power generator is controlled in accordance with the estimated power-consumption value and the estimated hot-water supply amount.

In the above the fuel-cell power generation system, the hot-water-supply-amount estimation means may include estimation-reference-data holding means for holding the actual hot-water supply amount measured before the given time point, as estimation reference data, neuro-model-based estimation means for estimating the future hot-water supply amount over the given time-period after the given time point, according to a neural network model using the estimation reference data as an input value, learning-control-reference-data holding means for holding an actual hot-water supply amount measured by the hot-water-supply measurement means in the same time zone as that of the estimated hot-water supply amount, as learning-control reference data, and neuro-model learning-control means for learning-controlling the neural network model in accordance with the learning-control reference data and the estimated hot-water supply amount.

According to this hot-water-supply-amount estimation means, the actual hot-water supply amount measured before the given time point is held as estimation reference data, and the future hot-water supply amount over the given time-period after the given time point is estimated by the neural network model using the estimation reference data as an input value. Then, an actual hot-water supply amount measured in the same time zone as that of the estimated hot-water supply amount is held as learning-control reference data, and a learning control is performed for the neural network model in accordance with the learning-control reference data and the estimated hot-water supply amount.

In the above fuel-cell power generation system, the operation control means may be operable to estimate an accumulative hot-water-storage amount to be accumulated from a current hot-water-storage amount, in accordance with the estimated power-consumption value from the power-consumption estimation means and the estimated hot-water supply amount from the hot-water-supply-amount estimation means, and adjust the output power of the fuel-cell power generator to prevent the estimated accumulative hot-water storage amount from becoming greater than a predetermined maximum allowable hot-water storage amount.

According to this operation control means, an accumulative hot-water storage amount to be accumulated from a current hot-water storage amount is estimated in accordance with the estimated power-consumption value and the estimated hot-water supply amount, and the output power of the fuel-cell power generator is adjusted to prevent the estimated accumulative hot-water storage amount from becoming greater than a predetermined maximum allowable hot-water storage amount.

In the above fuel-cell power generation system, the operation control means may be operable to estimate an accumulative hot-water storage amount to be accumulated from a current hot-water storage amount, in accordance with the estimated power-consumption value from the power-consumption estimation means and the estimated hot-water supply amount from the hot-water-supply-amount estimation means. Then, when the estimated accumulative hot-water storage amount is greater than a predetermined maximum allowable hot-water storage amount, the operation control means may be operable to perform a correction operation of slightly reducing the estimated power-consumption value, and further estimate an accumulative hot-water storage amount to be accumulated from a current hot-water storage amount, in accordance with the corrected estimated power-consumption value and the estimated hot-water supply amount.

According to this operation control means, an accumulative hot-water storage amount to be accumulated from a current hot-water storage amount is estimated in accordance with the estimated power-consumption value and the estimated hot-water supply amount. Then, when the estimated accumulative hot-water storage amount is greater than a predetermined maximum allowable hot-water storage amount, a correction operation of slightly reducing the estimated power-consumption value is performed, and an accumulative hot-water storage amount to be accumulated from a current hot-water storage amount is estimated in accordance with the corrected estimated power-consumption value and the estimated hot-water supply amount. After repeating the above operations, when an estimated accumulative hot-water storage amount less than the predetermined maximum allowable hot-water storage amount is obtained, the operation of the fuel-cell power generator is controlled in accordance with the lastly corrected estimated power-consumption value.

In the above fuel-cell power generation system, the operation control means may be operable to estimate an accumulative hot-water storage amount to be accumulated from a current hot-water storage amount, in accordance with the estimated power-consumption value from the power-consumption estimation means and the estimated hot-water supply amount from the hot-water-supply-amount estimation means. Then, when the estimated accumulative hot-water storage amount is greater than a predetermined maximum allowable hot-water storage amount, and the estimated power-consumption value provided from the power-consumption estimation means is less than a given lower limit successively for a given time-period, the operation control means may be operable to initiate a stop operation of the fuel-cell power generator at the time point when the estimated accumulative hot-water storage amount will become greater than the predetermined maximum allowable hot-water storage amount.

According to this operation control means, an accumulative hot-water storage amount to be accumulated from a current hot-water storage amount is estimated in accordance with the estimated power-consumption value and the estimated hot-water supply amount. Then, when the estimated accumulative hot-water storage amount is greater than a predetermined maximum allowable hot-water storage amount, and the estimated power-consumption value provided from the power-consumption estimation means is less than a given lower limit successively for a given time-period, the stop operation of the fuel-cell power generator will be initiated at the time point when the estimated accumulative hot-water storage amount will become greater than the predetermined maximum allowable hot-water storage amount.

In the above fuel-cell power generation system, the operation control means may be operable to estimate an accumu-lative hot-water storage amount to be accumulated from a current hot-water storage amount, in accordance with the estimated power-consumption value from the power-consumption estimation means and the estimated hot-water supply amount from the hot-water-supply-amount estimation means. Then, when the estimated accumulative hot-water storage amount is greater than a predetermined maximum allowable hot-water storage amount, and the estimated power-consumption value provided from the power-consumption estimation means is greater than a given lower limit successively for a given time-period, the operation control means may be operable to initiate a startup operation of the fuel-cell power generator at a time point going back from the time point when the estimated power-consumption value will initially become greater than the given lower limit, by a time-period necessary for the activation of the fuel-cell power generator.

According to this operation control means, an accumulative hot-water storage amount to be accumulated from a current hot-water storage amount is estimated in accordance with the estimated power-consumption value and the estimated hot-water supply amount. Then, when the estimated accumulative hot-water storage amount is greater than a predetermined maximum allowable hot-water storage amount, and the estimated power-consumption value provided from the power-consumption estimation means is greater than a given lower limit successively for a given time-period, the startup operation of the fuel-cell power generator will be initiated at a time point going back from the time point when the estimated power-consumption value will initially become greater than the given lower limit, by a time-period necessary for the activation of the fuel-cell power generator.

In order to achieve the above object, the present invention also provides a method for controlling a fuel-cell power generation system which includes a fuel-cell power generator adapted to generate electricity to be supplied to an electrical appliance. This method comprises a power measurement step of measuring an actual power-consumption value in the appliance, a power-consumption estimation step of estimating a future power-consumption value over a given time-period after a given time point, in accordance with the actual power-consumption value obtained in the power measurement step, and an operation control step of controlling the operation of the fuel-cell power generator in accordance with the estimated power-consumption value obtained in the power-consumption estimation step.

According to the above method for controlling a fuel-cell power generation system which includes a fuel-cell power generator adapted to generate electricity to be supplied to an electrical appliance, an actual power-consumption value in the appliance is measured, and a future power-consumption value over a given time-period after a given time point is estimated in accordance with the measured actual power-consumption value. Then, the operation of the fuel-cell power generator is controlled in accordance with the estimated power-consumption value.

The method of the present invention may further include a hot-water-supply measurement step of measuring an actual hot-water supply amount from a hot-water appliance adapted to supply hot water using the fuel-cell power generator, and a hot-water-supply-amount estimation step of estimating a future hot-water supply amount over a given time-period after a given time point, in accordance with the actual hot-water supply amount obtained in the hot-water-supply measurement step. In this case, the operation control step may include a step of controlling the operation of the fuel-cell power generator in accordance with the estimated power-consumption value obtained in the power-consumption estimation step and the estimated hot-water supply amount obtained in the hot-water-supply-amount estimation step.

According to this method for controlling a fuel-cell power generation system which includes a fuel-cell power generator adapted to generate electricity to be supplied to an electrical appliance, an actual hot-water supply amount from the hot-water appliance is measured, and a future hot-water supply amount over a given time-period after a given time point is estimated in accordance with the measured actual hot-water supply amount. Then, the operation of the fuel-cell power generator is controlled in accordance with the estimated power-consumption value and the estimated hot-water supply amount.

As mentioned above, in the fuel-cell power generation system and the control method therefor, an actual power-consumption value in an electrical appliance is measured, and a future power-consumption value over a given time-period after a given time point is estimated in accordance with the measured actual power-consumption value. Then, the operation of the fuel-cell power generator is controlled in accordance with the estimated power-consumption value. Thus, the fuel-cell power generation system and the control method of the present invention can estimate power consumption different in each of the homes so as to efficiently control the output power of the fuel-cell power generator to achieve a desirable energy saving performance.

Other features and advantages of the present invention will be apparent from the accompanying drawings and from the detailed description.

BRIEF DESCRIPTION OF THE DRAWINGS

FIG. 9 is an explanatory block diagram of a first neural network model for use in a first neuro-model-based estimation section in FIG. 8 to provide an estimated power-consumption value.

FIG. 10 is an explanatory block diagram of a neural network model for use in a neuro-model-based estimation section in FIG. 8 to provide an estimated hot-water supply amount.

DESCRIPTION OF THE PREFERRED EMBODIMENTS

Figure 1:
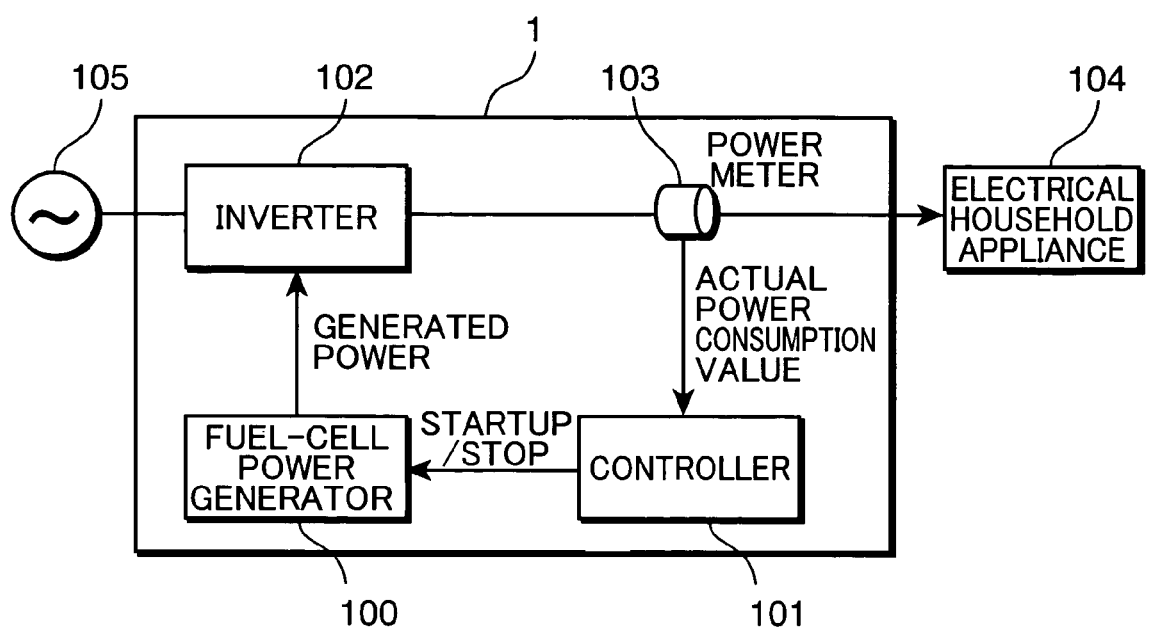
FIG. 1 is a general block diagram showing a fuel-cell power generation system according to a first embodiment of the present invention.

With reference to the drawings, an embodiment of the present invention will now be described. In the figures, the same component or element is defined by the same reference numeral, and its duplicate descriptions will be fundamentally omitted.

First Embodiment

FIG. 1 is a general block diagram showing a fuel-cell power generation system according to a first embodiment of the present invention. The fuel-cell power generation system 1 illustrated in FIG. 1 comprises a fuel-cell power generator 100, a power-generation control section (controller) 101, an inverter 102 and a power meter 103. The fuel-cell power generation system 1 is connected to an electrical household appliance 104 and a commercial power source 105.

The fuel-cell power generator 100, the inverter 102, the household appliance 104 as one example of an electrical appliance, and the commercial power source 105 are connected to an electric power system in a home. The power meter 103 is operable to measure an actual power-consumption value in the household appliance 104. The power meter 103 is connected to the controller 101, so that the actual power-consumption value in the household appliance 104 is sent from the power meter 103 to the controller 101. The household appliance 104 may be any electrical appliance for home use, such as refrigerator or washing machine. The number of electrical household appliances to be connected to the power meter 103 is not limited to one, but a plurality of electrical household appliances may be connected thereto.

The controller 101 is connected to the fuel-cell power generator 100. The controller 101 is operable to output instructions, such as startup/stop instructions, to the fuel-cell power generator 100 so as to control the operation of the fuel-cell power generator 100.

The fuel-cell power generator 100 is operable to convert chemical energy to electrical energy through a reaction between oxygen in the air and hydrogen obtained from fuel, such as city gas, so as to generate electric power or electricity. The generated power or output power of the fuel-cell power generator 100 is supplied to the inverter 102, and then sent from the inverter 102 to the household appliance 104. When the actual power-consumption value in the household appliance 104 is greater than the output power, the inverter 102 is operable to purchase electric power from the commercial power source 105 (power-buying operation) so as to make up a shortfall. Otherwise, when the actual power-consumption value is less than the output power, the inverter 102 is operable to sell surplus electric power to the commercial power source 105 (power-selling operation). If the commercial power source 105 does not permit the power-selling operation, the surplus electric power will be handled in the body of the fuel-cell power generator 100. In view of achieving higher efficiency in the fuel-cell power generator 100, it is desired to minimize the power-buying/selling operations. For this purpose, the controller 101 is required to output adequate startup/stop instructions to the fuel-cell power generator 100 so as to allow the power-buying/selling operations to be minimized.

Figure 2:
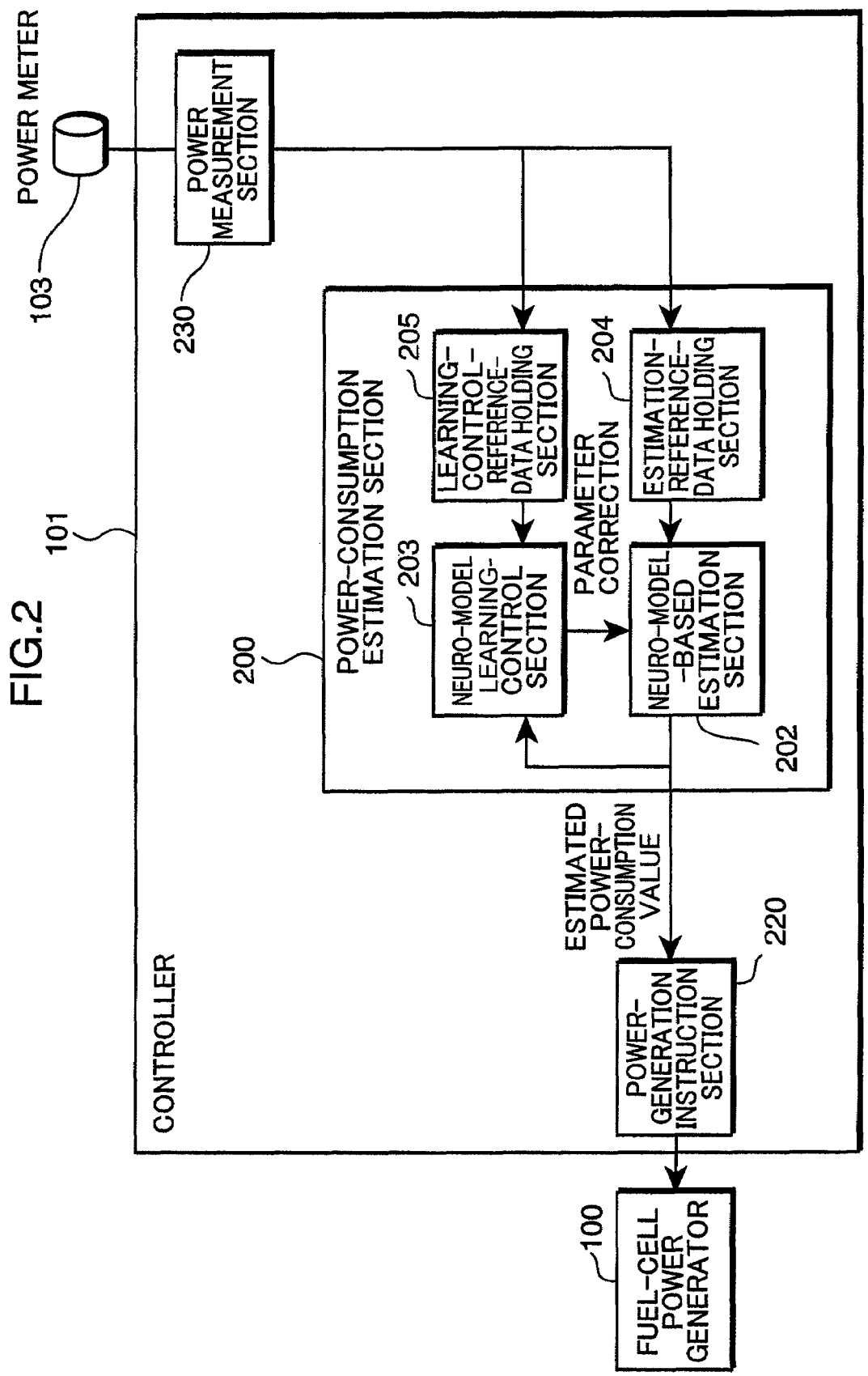
FIG. 2 is a block diagram showing a controller illustrated in FIG. 1.

FIG. 2 is a block diagram showing the controller 101 illustrated in FIG. 1. The controller 101 illustrated in FIG. 2 comprises a power-consumption estimation section 200, a power-generation instruction section (serving as one example of operation control means) 220, and a power measurement section 230.

The power measurement section 230 is operable to measure the actual power-consumption value in the household appliance 104. The power-consumption estimation section 200 is operable to estimate a future power-consumption value over a given time-period after a given time point, in accordance with the actual power-consumption value measured by the power measurement section 230. The power-consumption estimation section 200 includes a neuro-model-based estimation section 202, a neuro-model learning-control section 203, an estimation-reference-data holding section 204 and a learning-control-reference-data holding section 205.

The neuro-model-based estimation section 202 holds a hierarchical-type neural network model. The neuro-model-based estimation section 202 is operable to estimate the future power-consumption value over the given time-period after the given time point, according to the neural network model. The details of the neural network model, such as its features and learning-control process, is disclosed in "New Applications of Neural network" (written and edited by Shyunichi Amari, pp. 73-86, SAIENSU-SHA Co., Ltd., 1994), and its description will be omitted. In this embodiment, the power-consumption estimation section 200 is operable to estimate a power consumption value of the current day for the next 24 hours in the units of one hour.

Figure 3:
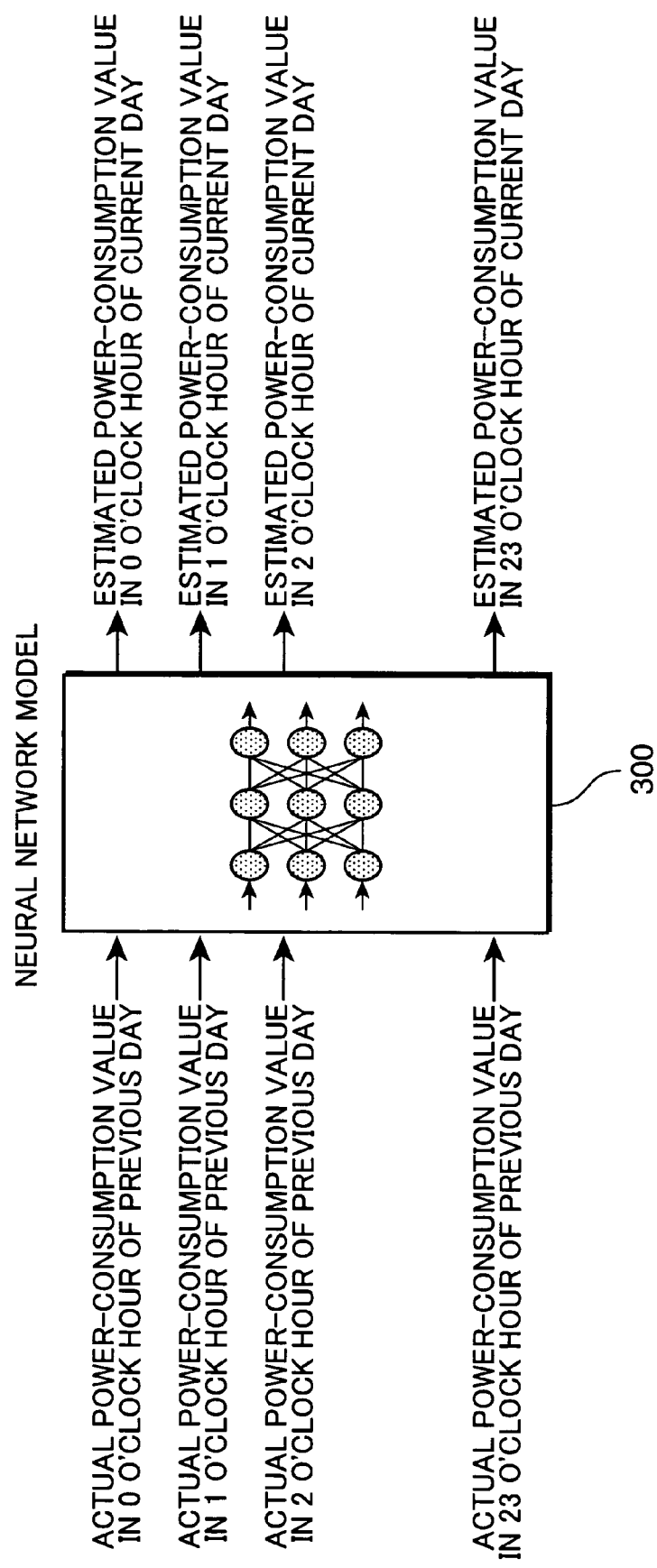
FIG. 3 is an explanatory block diagram of a neural network model for use in a neuro-model-based estimation section in FIG. 2.

FIG. 3 is an explanatory block diagram of the neural network model for use in the neuro-model-based estimation section 202 in FIG. 2. The neural network model 300 is an hierarchical-type neural network model having three layers consisting of an input layer, an intermediate layer and an output layer. In order to provide enhanced accuracy of the estimation, the neural network model 300 is essentially configured such that data having a strong correlation with an estimated value serving as an output parameter is used as an input parameter. Thus, an estimated power-consumption value of the current day is set as the output parameter, and an actual power-consumption value of the previous day, which would have a strong correlation with the estimated power-consumption value, is used as the input parameter.

In this embodiment, for performing the estimation for the next 24 hours in the units of one hour, the neural network model 300 has an output parameter consisting of 24 kinds of the following data: "an estimated power-consumption value in 0 (zero) o'clock hour of the current day", "an estimated power-consumption value in 1 o'clock hour of the current day", - - - , and "an estimated power-consumption value in 23 o'clock hour of the current day", and an input parameter consisting of 24 kinds of the following data: "an actual power-consumption value in 0 o'clock hour of the previous day", "an actual power-consumption value in 1 o'clock hour of the previous day", - - - , and "an actual power-consumption value in 23 o'clock hour of the previous day". The estimated power-consumption value in the n o'clock hour means an average value of power consumption between the beginning and the end of n o'clock. According to the neural network configured in this manner, the actual power-consumption value of the previous day can be entered at a time point just after 0 o'clock of the current day subject to the estimation to allow a power consumption value of the current day to be estimated in the units of one hour (for the next 24 hours).

Further, the neural network model 300 is configured such that the weighting factor thereof is corrected through a learning control using a back-propagation learning process in accordance with the difference (error) between an estimated value and a corresponding actually measured value, to provide enhanced accuracy of the estimation.

The estimation-reference-data holding section 204 is operable to acquire the actual power-consumption value from the power measurement section 230 and hold the actual power-consumption value only in the period of the previous 24 hours in the units of one hour. Then, when the date is updated, the estimation-reference-data holding section 204 is operable to send the held actual power-consumption value or the actual power-consumption value of the previous day serving as an input for the neural network model 300, to the neuro-model-based estimation section 202. The neuro-model-based estimation section 202 is then operable to input the received actual power-consumption value of the previous day into the neural network model 300, so as to output an estimated power-consumption value of a 24-hour time-period in the current day. Then, the power-generation instruction section 220 is operable to determine the need of the startup or stop of the fuel-cell power generator 100 in accordance with the estimated power-consumption value sent thereto.

As described above, the learning control using a back-propagation learning process is performed for the neural network model 300 in accordance with the difference (error) between the estimated power-consumption value and an actual power-consumption value corresponding to the estimated power-consumption value (hereinafter referred to as "measured power-consumption value), to provide enhanced accuracy of the estimation. The learning control effective to provide enhanced accuracy of the estimation cannot be practically performed without estimated power-consumption values and measured power-consumption values of the past several days. Thus, the learning-control-reference-data holding section 205 holds the estimated power-consumption value of a 24-hour time-period from the neuro-model-based estimation section 202, and the measured power-consumption values of the past several days corresponding to the respective time zones, and uses these values as learning-control reference data. The learning-control-reference-data holding section 205 receives the measured power-consumption value from the power measurement section 230, and holds it in the units of one hour. The measured power-consumption value will be fully obtained at a time the day subject to the estimation power-consumption value has passed. Then, when the measured power-consumption value of a 24-hour time-period has been fully obtained, the learning-control-reference-data holding section 205 is operable to send it to the neuro-model learning-control section 203. The above operation will be repeatedly performed for several days to allow the neuro-model learning-control section 203 to have data consisting of the plural pairs of the estimated power-consumption values and measured power-consumption values of the past several days. Thus, the learning control can be performed using the data to correct the weighting factor of the neural network model 300 in the neuro-model-based estimation section 202, so that the estimation for each of the homes can be performed with a high degree of accuracy.

In order to provide further enhanced accuracy, the data for use in the learning control is preferably classified by some parameters. For example, in case where the estimation is performed for weekdays, the data of weekdays allow the learning control to be more effectively performed.

Further, in the initial stage where any learning control has not been performed for the neural network 300 at all, the estimation should be executed after sufficient data for the learning control or data of several days are assured, and the learning control is performed at least one time.

The estimated power-consumption value of a 24-hour time-period between the 0 o'clock hour and the 23 o'clock hour is sent from the neuro-model-based estimation section 202 of the power-consumption estimation section 200 to the power-generation instruction section 220. The power-generation instruction section 220 is operable to determine the need of the startup or stop for allowing the efficient operation of the fuel-cell power generator 100, in accordance with the estimated power-consumption value, and then send a startup or stop instruction to the fuel-cell power generator 100 in accordance with the determination result.

The determination of the operation of the fuel-cell power generator 100 based on the estimated power-consumption value from the power-consumption estimation section 200 will be described below in more detail.

Generally, the variable range of the output power of a fuel-cell power generator 100 has an upper limit and a lower limit which are set up in consideration of performance and efficiency. For example, a fuel-cell power generator 100 for home use is designed to have an upper limit of 1 kW and a lower limit of 0.5 kW, and an operation under the condition of changing the output power in conformity to an actual power-consumption value, or an electricity-(demand)-based operation, can be performed as long as the output power is in the range of the lower limit to the upper limit.

However, the determination of the startup/stop to be simply performed when the actual power-consumption value falls within the range of the low limit to upper limit involves a serious problem with efficiency. Specifically, a startup loss, such as pump power or waste heat, inevitably occurs during the course of gradual rise of output power in the startup period. Thus, frequent startup/stop operations causing increased loss are undesirable in view of efficiency. Generally, it is reported that, once activated, the operation should be continued for about 2 to 3 hours. Therefore, the power-generation instruction section 220 is configured to determine the need of the startup/stop in accordance with an estimated power-consumption value in a given time-period, for example, a continuous period of 3 hours.

Figure 4:
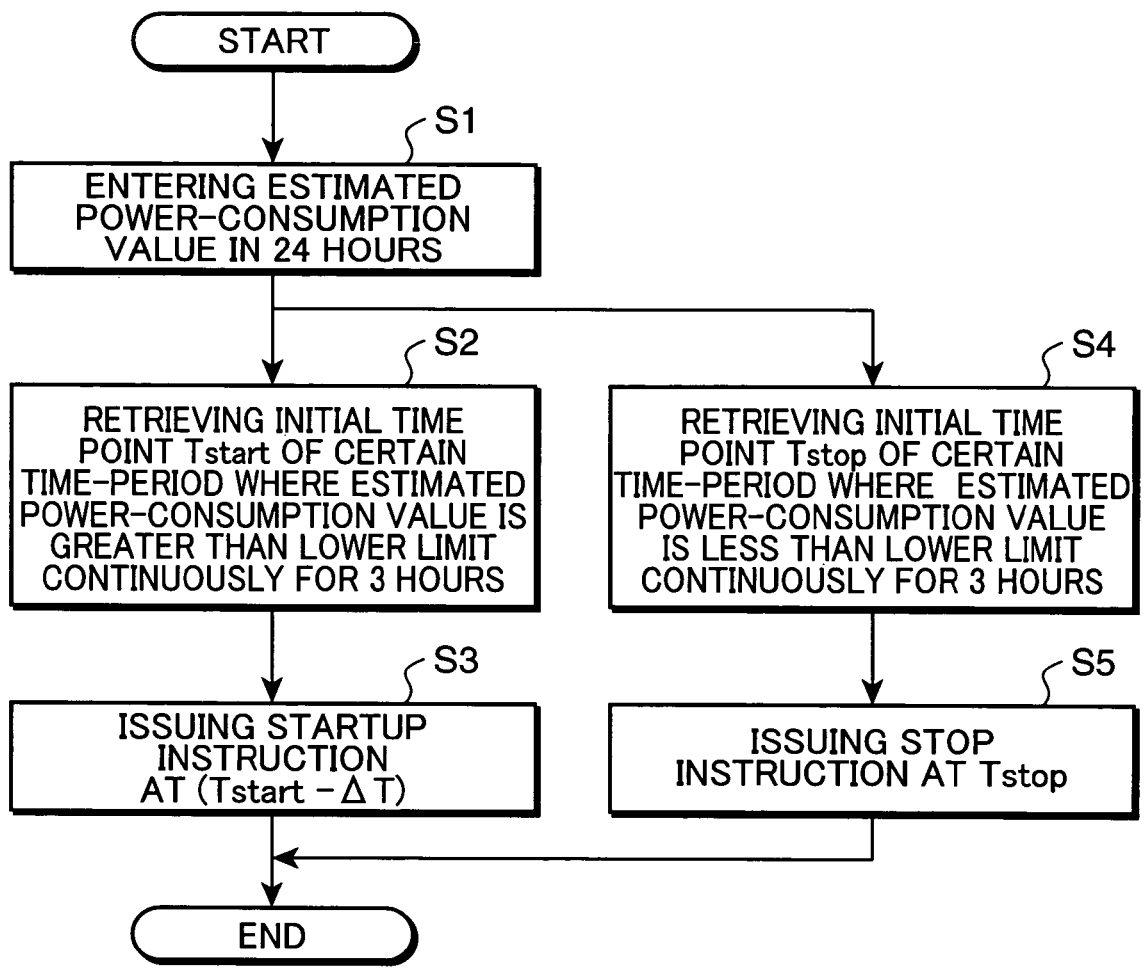
FIG. 4 is an explanatory operational flowchart of a power-generation instruction section in FIG. 2.

FIG. 4 is an explanatory operational flowchart of the power-generation instruction section 220 in FIG. 2. In response to entering an estimated power-consumption value of a 24-hour time-period from the power-consumption estimation section 200 at 0 o'clock of the day for the operation of the fuel-cell power generator 100 (Step S1), the power-generation instruction section 220 retrieves an initial time point Tstart of a certain time-period where the estimated power-consumption value is greater than a predetermined lower limit continuously for 3 hours, from the estimated power-consumption value of a 24-hour time-period, to determine the need of the startup of the fuel-cell power generator 100 (startup determination) (Step S2). Given that a time-period necessary for the activation of the fuel-cell power generator 100 is $\Delta T$, the power-generation instruction section 220 will output an instruction for the startup at a time point satisfying the following formula: (Tstart−$\Delta T$) (Step S3). Further, in order to determine the need of the stop of the fuel-cell power generator 100 (stop determination), the power-generation instruction section 220 retrieves an initial time point Tstop of a certain time-period where the estimated power-consumption value is less than a predetermined lower limit continuously for 3 hours, from the estimated power-consumption value of a 24-hour time-period (Step S4). Then, the power-generation instruction section 220 will output an instruction for the stop at a time point corresponding the Tstop, to the fuel-cell power generator 100 (Step S5).

Figure 5:
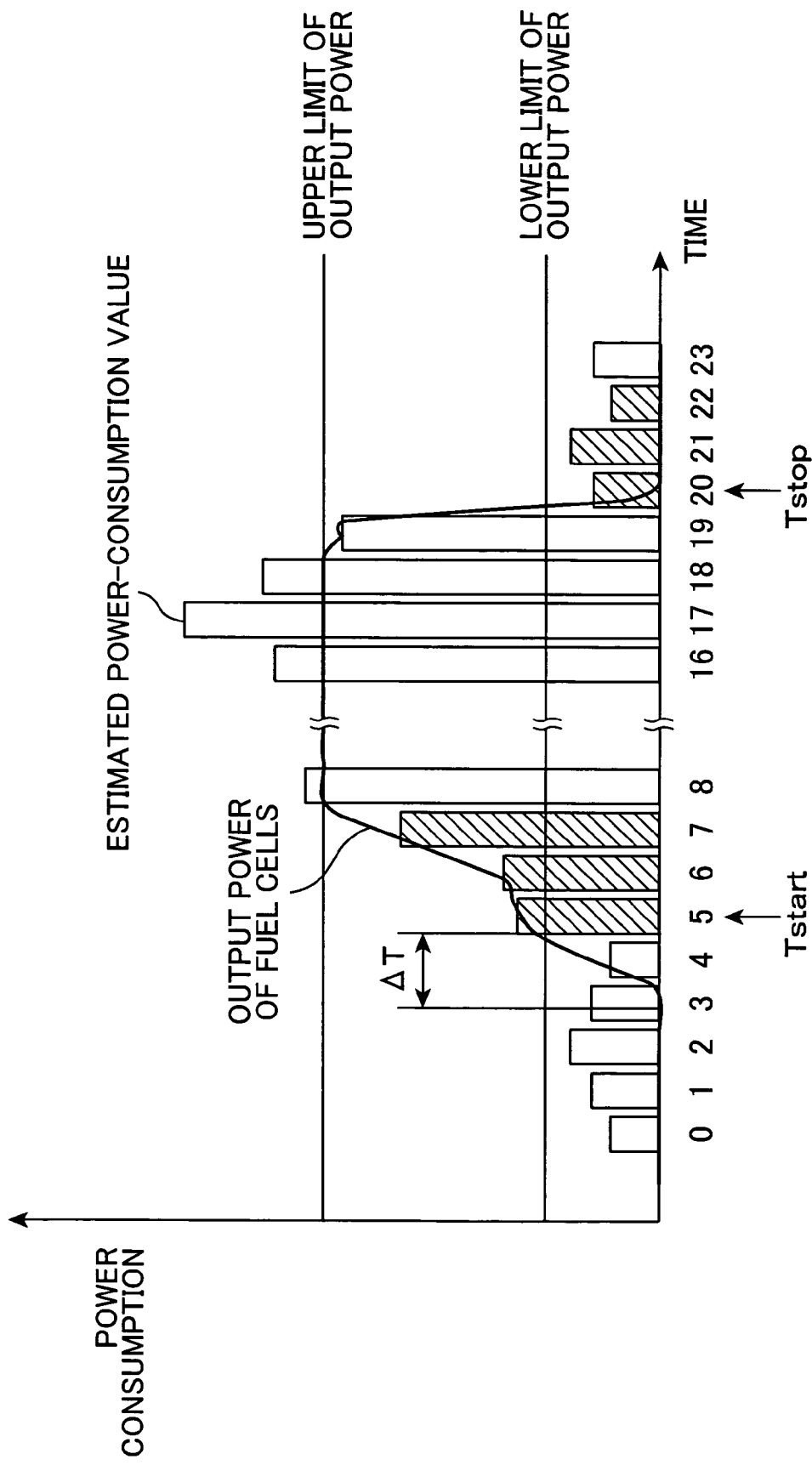
FIG. 5 is an explanatory diagram of one example of the relationship between an output power and an estimated power-consumption value in the fuel-cell power generation system.

FIG. 5 is an explanatory diagram of one example of the relationship between the output power and the estimated power-consumption value in the fuel-cell power generation system 100 during the above series of operations. In FIG. 5, the vertical axis represents electric power, and the horizontal axis represents time. In this figure, the estimated power-consumption value and the output power of the fuel-cell power generator 100 between 8 to 16 o'clock are omitted.

In the startup determination, the estimated power-consumption value in the time-period from 0 to 23 o'clock is retrieved to find a certain time zone where the estimated power-consumption value is greater than the lower limit continuously for 3 hours. In the example illustrated in FIG. 5, the time zone where the estimated power-consumption value is greater than the lower limit continuously for 3 hours is initiated at 5 o'clock. Thus, Tstart=5 o'clock, and the startup instruction will be outputted from the power-generation instruction section 220 at a time point (5−$\Delta T$). In response to receiving the startup instruction, the fuel-cell power generator 100 is activated to start generating electricity. In this process, the fuel-cell power generator 100 activated earlier than Tstart, or going back from Tstart, by the time-period $\Delta T$ necessary for the activation of the fuel-cell power generator 100 can supply an output power equal to the estimated power-consumption value no later than 5 o'clock. In addition, the estimated power-consumption value shows in advance that a certain power consumption will continuously take place for at least 3 hours after Tstart=5 o'clock. Thus, the fuel-cell power generator 100 can be operated for at least 3 hours after activation without surplus of generated power or stop operation. This makes it possible to perform further efficient startup operation.

Similarly, in the stop determination, the estimated power-consumption value in the time-period from 0 to 23 o'clock hour is retrieved to find a certain time zone where the estimated power-consumption value is less than the lower limit continuously for 3 hours. In the example illustrated in FIG. 5, the time zone where the estimated power-consumption value is less than the lower limit continuously for 3 hours is initiated at 20 o'clock. Thus, Tstop=20 o'clock, and the stop instruction will be outputted from the power-generation instruction section 220 at 20 o'clock. While the fuel-cell power generator 100 is stopped in response to receiving the stop instruction, the estimated power-consumption value shows in advance that a power consumption will be continuously less than the lower limit for at least 3 hours after Tstop=20 o'clock. Thus, any need for restarting the fuel-cell power generator 100 can be eliminated for at least 3 hours after stop. This makes it possible to perform further efficient stop operation.

Figure 6:
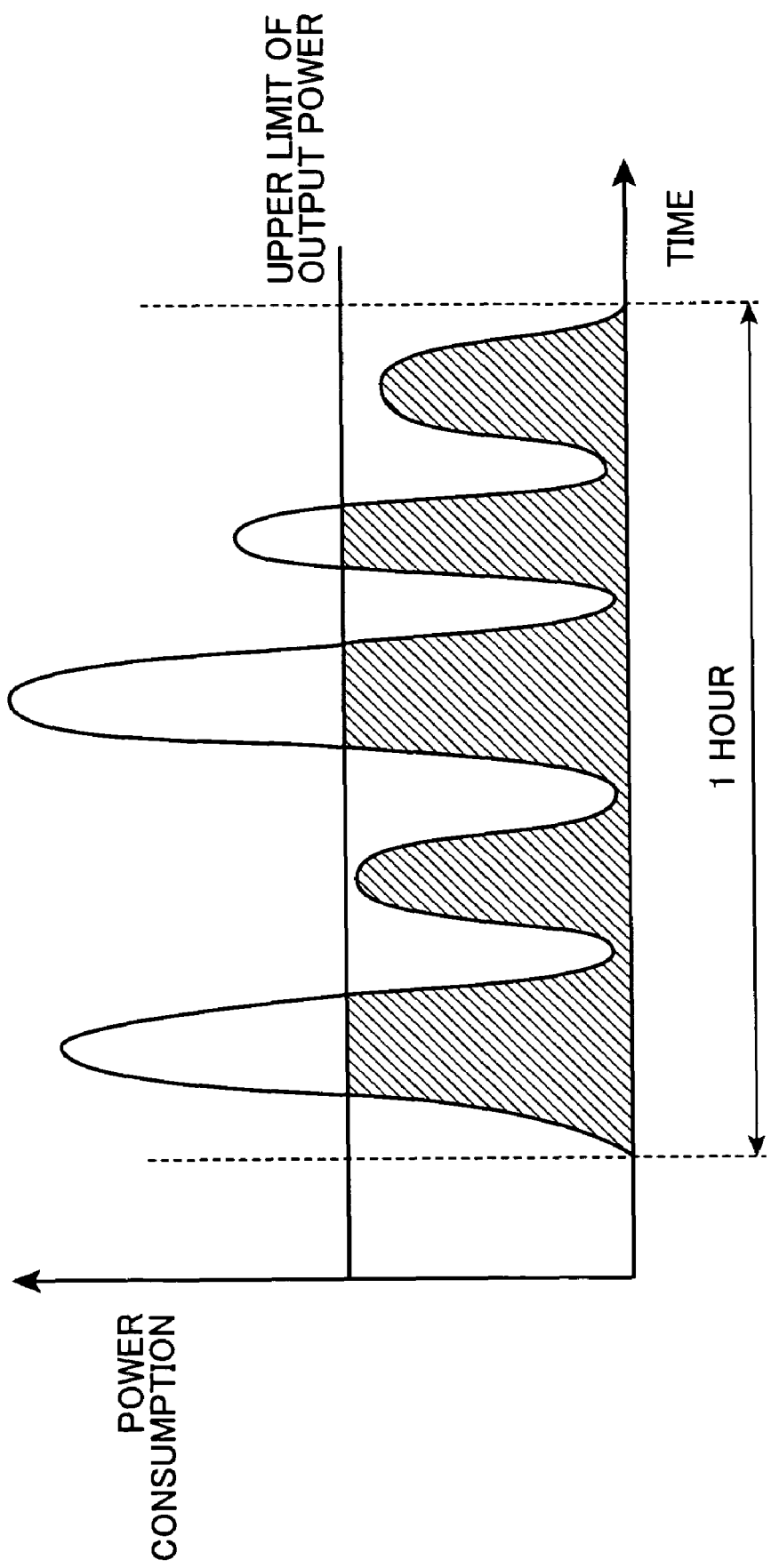
FIG. 6 is an explanatory diagram of an actual power-consumption value measured by a power measurement section in FIG. 2.

FIG. 6 is an explanatory diagram of an actual power-consumption value measured by the power measurement section 230 in FIG. 2. In FIG. 6, the vertical axis represents actual power-consumption value in the household appliance, and the horizontal axis represents time. FIG. 6 shows the changes of the actual power-consumption value in the period of 1 hour between 0 to 24 o'clock.

As described above, the actual power-consumption value of the household appliance 104 is detected by the power meter 103. Then, the power measurement section 230 acquires the detected value, and enters it into the power-consumption estimation section 200. In this process, the maximum power-consumption value covered by the output power of the fuel-cell power generator 100 is the upper limit of the output power, as shown in FIG. 6. Thus, the actual power-consumption value practically associated with the output power is a region indicated by diagonal lines in FIG. 6, and the remaining region greater than the upper limit is out of relation to the output power. Thus, the power measurement section 230 acquires only the region which is equal to or less than the upper limit of the output power (region indicated by diagonal lines in FIG. 6) as the actual power-consumption value, and enters it into the power-consumption estimation section 200.

Thus, if the actual power-consumption value of the household appliance 104 is greater than the upper limit of the output power, the upper limit is measured as a substitute for the actual power-consumption value. In this manner, a specific actual power-consumption value as in a hair dryer or microwave, which sharply rises up in a short time and is not practically covered by the fuel-cell power generator 100, can be excluded to thereby allow the estimated power-consumption value to be calculated only using the actual power-consumption value actually covered by the fuel-cell power generator 100. This makes it possible to perform the startup/stop determinations with higher efficiency.

The operation of a control system for the fuel-cell power generator 100, which is adapted to estimate the actual power-consumption value of the household appliance 104 and determine the operation of the fuel-cell power generator 100, will be described below.

When a timer (not shown) incorporated in the controller 101 indicates a time point for initiating the estimation, the estimation-reference-data holding section 204 sends the estimation reference data to the neuro-model-based estimation section 202. In this embodiment, a power-consumption value of a 24-hour time-period from 0 to 23 o'clock hour is estimated in the units of one hour. Thus, just after 0 o'clock, the estimation-reference-data holding section 204 sends the actual power-consumption value in each of the time zones between 0 o'clock hour and 23 o'clock hour serving as the estimation reference data to the neuro-model-based estimation section 202.

The neuro-model-based estimation section 202 estimates a future power-consumption value of the fuel-cell power generator 100 over a 24-hour time-period after each of time zones in the period from 0 to 23 o'clock hour. The estimated power-consumption value in each of the time zones between 0 and 23 o'clock hour is sent from the neuro-model-based estimation section 202 to the power-generation instruction section 220.

The power-generation instruction section 220 determines the operation of the fuel-cell power generator 100. Specifically, the power-generation instruction section 220 retrieves an initial time point Tstart in a certain time-period where the estimated power-consumption value in each of the time zones between 0 and 23 o'clock hour, which is received from the neuro-model-based estimation section 202, is greater than a predetermined lower limit continuously for 3 hours.

Further, the power-generation instruction section 220 retrieves an initial time point Tstop in a certain time-period where the estimated power-consumption value in each of the time zones between 0 and 23 o'clock hour, which is received from the neuro-model-based estimation section 202, is less than a predetermined lower limit continuously for 3 hours.

The timekeeping is performed by a timer (not shown) incorporated in the controller 101, and the power-generation instruction section 220 instructs the fuel-cell power generator 100 to start up, at a time point derived by subtracting a time-period ΔT necessary for the activation of the fuel-cell power generator 100 from the time point Tstart, or a time point going back from the time point Tstart by the time-period ΔT. Further, the power-generation instruction section 220 instructs the fuel-cell power generator 100 to stop, at the time point Tstop.

As above, according to the first embodiment of the present invention, in the power-consumption estimation section 200, a learning control is performed for the neural network model 300 in accordance with a measured power-consumption value of a household appliance. Thus, a power-consumption value to be varied between homes can be estimated over a 24-hour time-period, and the startup and stop determinations can be performed in accordance with the estimated power-consumption value from the power-generation instruction section 220, to prevent frequent startup/stop operations of the fuel-cell power generator 100 so as to allow the fuel-cell power generator 100 to be efficiently operated.

While the estimated power-consumption value in the first embodiment is estimated over a 24-hour time-period of the current day in the units of one hour, the time-period and the unit are not limited to 24 hours and one hour. For example, the input and output parameters of the neural network model 300 can be readily arranged to allow the estimation of power consumption to be performed for 6 hours in the units of 30 minutes.

While the subject of the estimation in first embodiment is power consumption, a hot-water supply amount may be detected and subjected to the estimation in the same manner. This case will be described later in detail as a second embodiment.

In the first embodiment of the present invention, the actual power-consumption value of the household appliance 104 is measured, and a future power-consumption value over a given time-period after a given time point in accordance with the measured power-consumption value. Then, the need of the startup/stop of the fuel-cell power generator 100 is determined in accordance with the estimated power-consumption value. Thus, a power consumption to be varied between homes can be estimated so as to efficiently control the output power of the fuel-cell power generator 100 to achieve a desirable energy saving performance.

Further, the actual power-consumption value measured before a given time point is held as estimation reference data. The future power consumption value over the given time-period after the given time point is estimated by the neural network model 300 using the estimation reference data as an input value, and an actual power-consumption value in the same time zone as that of the estimated power-consumption value is measured and held as learning-control reference data. Then, a learning control is performed for the neural network model 300 in accordance with the held leaning-control reference data and the corresponding estimated power-consumption value. Thus, a power-consumption value to be varied between homes can be estimated with a higher degree of accuracy.

Second Embodiment

A fuel-cell power generation system according to a second embodiment of the present invention will be described below. The fuel-cell power generation system according to the first embodiment is designed such that a future power-consumption value over a given time-period after a given time in accordance with an actual power-consumption value in a household appliance 104, and the startup/stop of the fuel-cell power generator 100 is determined in accordance with the estimated power-consumption value. By contrast, the fuel-cell power generation system according to the second embodiment is designed such that a hot-water supply amount from a hot-water appliance adapted to supply hot water using the fuel-cell power generator 100 is measured to estimate a future hot-water supply amount over a given time-period after a given time in accordance with the measured hot-water supply amount, and the operation of the fuel-cell power generator 100 is controlled in accordance with the estimated power-consumption value and the estimated hot-water supply amount.

Figure 7:
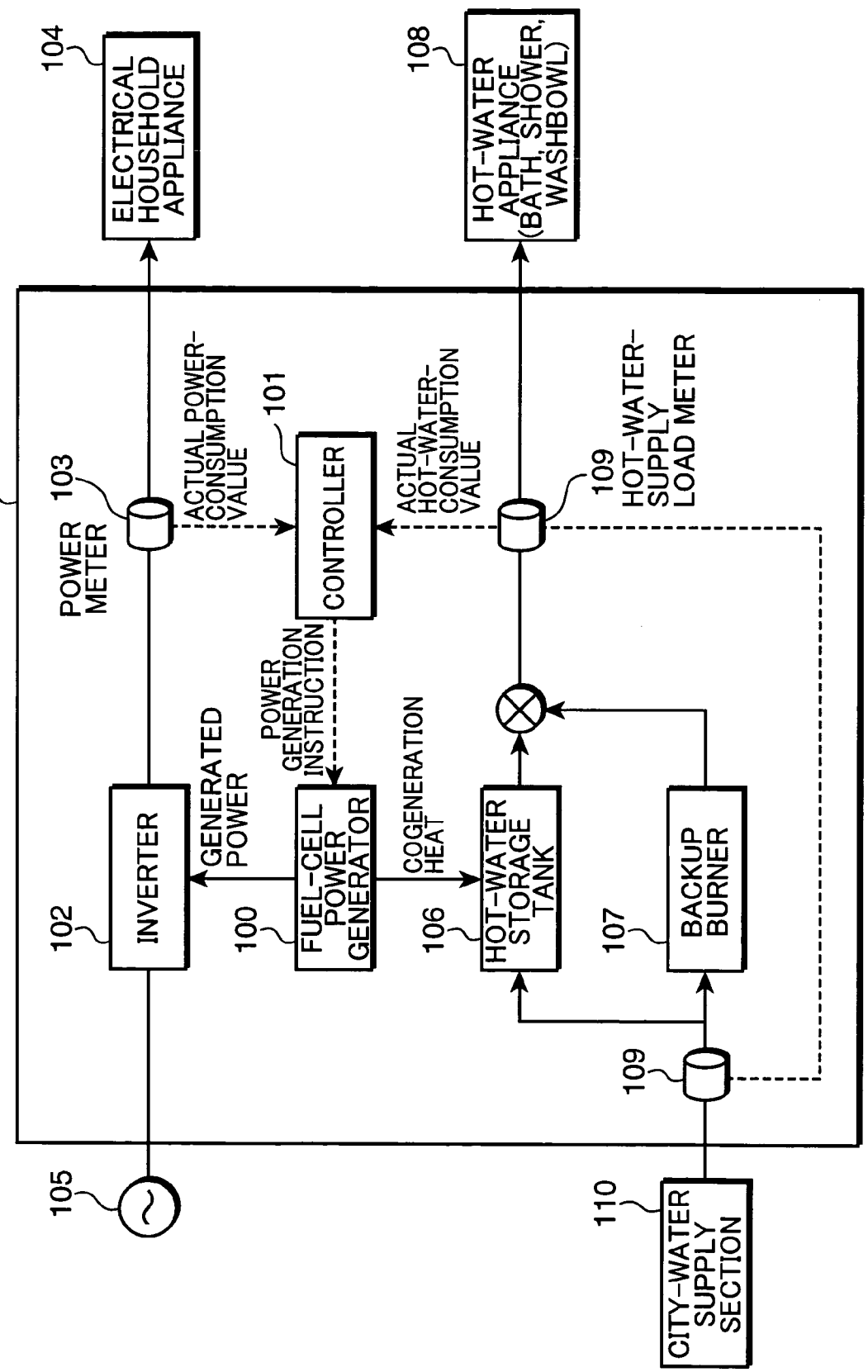
FIG. 7 is a general block diagram showing a fuel-cell power generation system according to a second embodiment of the present invention.

FIG. 7 is a general block diagram showing the fuel-cell power generation system according to the second embodiment of the present invention. The fuel-cell power generation system 2 according to the second embodiment illustrated in FIG. 7 comprises a fuel-cell power generator 100, a power-generation control section (controller) 101, an inverter 102, a power meter 103, hot-water storage tank 106, a backup burner 107 and a hot-water-supply load meter 109. The fuel-cell power generation system 2 is connected to an electrical household appliance 104, a commercial power source 105, a hot-water appliance 108 and a city-water supply section 110.

The fuel-cell power generator 100, the inverter 102, the household appliance 104 and the commercial power source 105 are connected to an electric power system in a home. The power meter 103 is operable to measure an actual power-consumption value in the household appliance 104. The hot-water storage tank 106, the backup burner 107, the hot-water appliance 108 and the city-water supply section 110 are connected to a hot-water supply system in the home. The hot-water appliance 108 may include any appliance with which a user uses hot water, such as bath, shower or washbowl. The hot-water-supply load meter 109 is operable to measure the amount and temperature of hot water to be supplied to the hot-water appliance 108, and the temperature of city water to be supplied from the city-water supply section 110, so as to measure a heat amount of a hot-water supply load, which is consumed by the hot-water appliance 108. The heat amount of the hot-water supply load is hereinafter referred to as "actual heat-consumption value".

The power meter 103 and the hot-water-supply load meter 109 are connected to the controller 101, so that the actual power-consumption value in the household appliance 104 is sent from the power meter 103 to the controller 101, and the actual heat-consumption value in the hot-water appliance 108 is sent from the hot-water-supply load meter 109 to the controller 101. The controller 101 is connected to the fuel-cell power generator 100. The controller 101 is operable to send a power-generation instruction to the fuel-cell power generator 100, and the fuel-cell power generator 100 generates electric power or electricity in response to the power-generation instruction.

The fuel-cell power generator 100 is operable to convert chemical energy to electrical energy through a reaction between oxygen in the air and hydrogen obtained from fuel, such as city gas, so as to generate electricity. The generated power or output power of the fuel-cell power generator 100 is supplied to the inverter 102, and then sent from the inverter 102 to the household appliance 104. When the actual power-consumption value in the household appliance 104 is greater than the output power, the inverter 102 is operable to purchase electric power from the commercial power source 105 (power-buying operation) so as to make up a shortfall. Otherwise, when the actual power-consumption value is less than the output power, the inverter 102 is operable to sell surplus electric power to the commercial power source 105 (power-selling operation). If the commercial power source 105 does not permit the power-selling operation, the surplus electric power will be handled in the body of the fuel-cell power generator 100.

The fuel-cell power generator 100 generates heat in conjunction with the power generation. The generated heat is used as cogeneration heat for heating water, and stored as hot water in the hot-water storage tank 106. The hot water stored in the hot-water storage tank 106 is turned on from the hot-water appliance 108 according the user's need. On this occasion, if a desired amount of hot water is not in the hot-water storage tank 106, the backup burner 106 will create hot water and provides it to the hot-water appliance 108. The reason of the absence of hot water in the hot-water storage tank 106 includes a low generated power of the fuel-cell power generator 100 due to a low actual power-consumption value in the household appliance 104, or an excessively large amount of consumed hot water in the hot-water appliance 108. Reversely, if the generated power of the fuel-cell power generator 100 is high due to a high actual power-consumption value in the household appliance 104, or the amount of consumed hot-water in the hot-water appliance 108 is very low, the cogeneration heat will be relatively increased, and likely to cause overfilling of the hot-water storage tank 106. In this case, the cogeneration heat has to be discarded by means of heat releasing to outside or the like, or the fuel-cell power generator 100 has to be completely stopped to prevent cogeneration heat from being further generated. This involves restarts causing occurrence of startup loss.

Thus, in order to provide enhanced efficiency in the fuel-cell power generator 100, it is required to control cogeneration heat such that overfilling of hot water in the hot-water storage tank 106 is minimized, or to send the power-generation instruction for adequately adjusting the output power.

Figure 8:
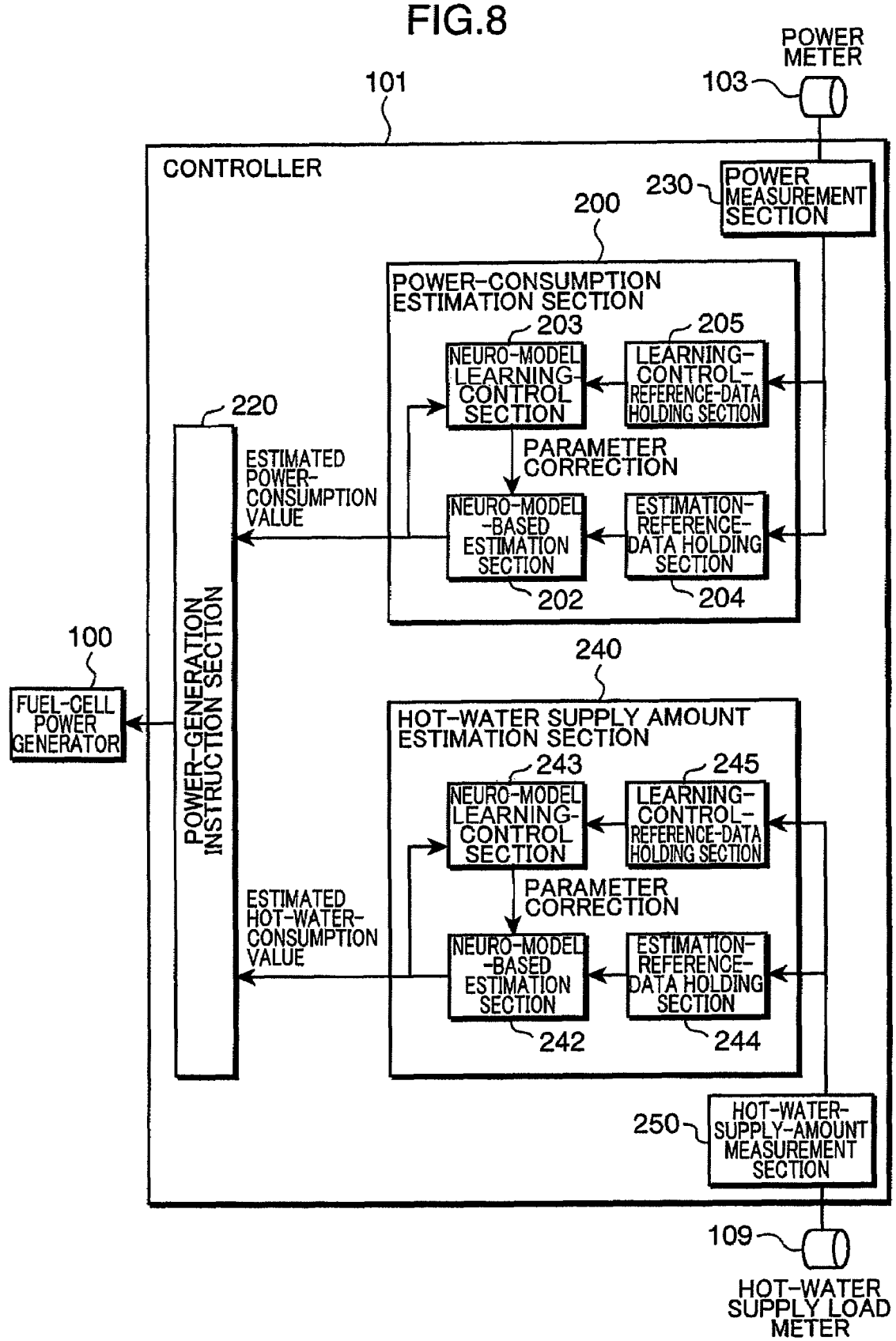
FIG. 8 is a block diagram showing a controller illustrated in FIG. 7.

FIG. 8 is a block diagram showing the controller 101 illustrated in FIG. 7. The controller 101 illustrated in FIG. 8 comprises a power-consumption estimation section 200, hot-water amount estimation section 240, a power-generation instruction section 220, a power measurement section 230 and a hot-water-supply-amount measurement section 250.

The actual power-consumption value will be first described. The power measurement section 230 is operable to measure the actual power-consumption value in the household appliance 104. The power-consumption estimation section 200 is operable to estimate a future power-consumption value over a given time-period after a given time point, in accordance with the actual power-consumption value measured by the power measurement section 230. The power-consumption estimation section 200 includes a neuro-model-based estimation section 202, a neuro-model learning-control section 203, an estimation-reference-data holding section 204 and a learning-control-reference-data holding section 205.

The neuro-model-based estimation section 202 holds a hierarchical-type neural network model. The neuro-model-based estimation section 202 is operable to estimate the future power-consumption value over the given time-period after the given time point, according to the neural network model. The details of the neural network model, such as its features and learning-control process, is disclosed in "New Applications of Neural network" (written and edited by Shyunichi Amari, pp. 73-86, SAIENSU-SHA Co., Ltd., 1994), and its description will be omitted. In this embodiment, the power-consumption estimation section 200 is operable to estimate a future power-consumption value over a 24-hour time-period after a time point when the estimation is performed, in the units of one hour.

FIG. 9 is an explanatory block diagram of the neural network model for use in the neuro-model-based estimation section 202 in FIG. 8. The neural network model 310 is hierarchical-type neural network model having three layers consisting of an input layer, an intermediate layer and an output layer. In order to provide enhanced accuracy of the estimation, the neural network model 310 is essentially configured such that data having a strong correlation with an estimated value serving as an output parameter is used as an input parameter. Thus, an estimated power-consumption value of the current day is set as the output parameter, and an actual power-consumption value of the previous day, which would have a strong correlation with the estimated power-consumption value, is used as the input parameter.

In this embodiment, for performing the estimation for the next 24 hours in the units of one hour, the neural network model 310 has an output parameter consisting of 24 kinds of the following data: "an estimated power-consumption value in n o'clock hour when the estimation is performed", "an estimated power-consumption value in n+1 o'clock hour", - - - , and "an estimated power-consumption value in n+23 o'clock hour", and an input parameter consisting of 24 kinds of the following data: "an actual power-consumption value in n o'clock hour of the previous day" (n o'clock hour is the same as that when the estimation is performed), "an actual power-consumption value in n+1 o'clock hour of the previous day", - - - , and "an actual power-consumption value in n+23 o'clock hour of the previous day". In the above "power-consumption value in n o'clock hour", given that the estimation is performed at 0 o'clock, it means an average value of power consumption between the beginning and the end of 0 o'clock. According to the neural network configured in this manner, the actual power-consumption value of the previous day can be entered at a time point just after 0 o'clock of the current day subject to the estimation to allow a power consumption value of the current day to be estimated in the units of one hour (over a 24-hour time-period).

Further, the neural network model 310 is configured such that the weighting factor thereof is corrected through a learning control using a back-propagation learning process in accordance with the difference (error) between an estimated value and a corresponding actually measured value, to provide enhanced accuracy of the estimation.

The estimation-reference-data holding section 204 is operable to acquire the actual power-consumption value from the power measurement section 230 and hold the actual power-consumption value of only a previous 24 hours in the units of one hour. Then, when the date is updated, the estimation-reference-data holding section 204 is operable to send the held actual power-consumption value or the actual power-consumption value of the previous day serving as an input for the neural network model 310, to the neuro-model-based estimation section 202. The neuro-model-based estimation section 202 is then operable to input the received actual power-consumption value of the previous day into the neural network model 310, so as to output an estimated power-consumption value of a 24-hour time-period starting from the time point of the estimation. The estimated power-consumption value is sent to the power-generation instruction section 220.

As described above, the learning control using a back-propagation learning process is performed for the neural network model 310 in accordance with the difference (error) between the estimated power-consumption value and an actual power-consumption value corresponding to the estimated power-consumption value (hereinafter referred to as "measured power-consumption value), to provide enhanced accuracy of the estimation. The learning control effective to provide enhanced accuracy of the estimation cannot be practically performed without estimated power-consumption values and measured power-consumption values of the past several days. Thus, the learning-control-reference-data holding section 205 holds the estimated power-consumption value of a 24-hour time-period from the neuro-model-based estimation section 202, and the measured power-consumption values of the past several days corresponding to the respective time zones, and uses these values as learning-control reference data. The learning-control-reference-data holding section 205 receives the measured power-consumption value from the power measurement section 230, and holds it in the units of one hour. The measured power-consumption value will be fully obtained at a time the day subject to the estimation power-consumption value has passed. Then, when the measured power-consumption value of a 24-hour time-period has been fully obtained, the learning-control-reference-data holding section 205 is operable to send it to the neuro-model learning-control section 203. The above operation will be repeatedly performed for several days to allow the neuro-model learning-control section 203 to have data consisting of the plural pairs of the estimated power-consumption values and measured power-consumption values of the past several days. Thus, the learning control can be performed using the data to correct the weighting factor of the neural network model 310 in the neuro-model-based estimation section 202, so that the estimation for each of the homes can be performed with a high degree of accuracy.

In order to provide further enhanced accuracy, the data for use in the learning control is preferably classified by some parameters. For example, in case where the estimation is performed for weekdays, the data of weekdays allow the learning control to be more effectively performed.

Further, in the initial stage where any learning control has not been performed for the neural network 310 at all, the estimation should be executed after sufficient data for the learning control or data of several days are assured, and the learning control is performed at least one time.

The estimated power-consumption value of a 24-hour time-period after the time point of the estimation is sent from the neuro-model-based estimation section 202 of the power-consumption estimation section 200 to the power-generation instruction section 220.

The hot-water supply system will be described below. The hot-water-supply-amount measurement section 250 is operable to measure an actual hot-water supply amount used by the hot-water appliance 108. The hot-water-supply-amount estimation section 240 is operable to estimate a future hot-water supply amount over a given time-period after a given time point in accordance with the actual hot-water supply amount measured by the hot-water-supply-amount measurement section 250. The hot-water-supply-amount measurement section 250 comprises a neuro-model-based estimation section 242, a neuro model learning-control section 243, an estimation-reference-data holding section 244 and a learning-control-reference-data holding section 245.

While the operation of the hot-water-supply-amount estimation section 240 is fundamentally the same as that of the power-consumption estimation section 200, a neural network model for use in the neuro-model-based estimation section 242 is configured as shown in FIG. 10. The neural network model 320 is an hierarchical-type neural network model having three layers consisting of an input layer, an intermediate layer and an output layer. In order to estimate a hot-water supply amount in the units of one hour over a 24-hour time-period after a time point when the estimation is performed, the neural network model 320 has an output parameter consisting of 24 kinds of the following data: "an estimated hot-water supply amount in n o'clock hour when the estimation is performed", "an estimated hot-water supply amount in n+1 o'clock hour", - - - , and "an estimated hot-water supply amount in n+23 o'clock hour", and an input parameter consisting of 24 kinds of the following data: "an actual hot-water supply amount in n o'clock hour of the previous day" (n o'clock hour is the same that when the estimation is performed), "an actual hot-water supply amount in n+1 o'clock hour of the previous day", - - - , and "an actual hot-water supply amount in n+23 o'clock hour of the previous day". In the above "hot-water supply amount in n o'clock hour", given that the estimation is performed at 0 o'clock, it means an average value of power consumption between the beginning and the end of 0 o'clock. According to the neural network configured in this manner, the actual hot-water supply amount of the previous day can be entered at a time point just after 0 o'clock of the current day subject to the estimation to allow a hot-water supply amount of the current day to be estimated in the units of one hour (over a 24-hour time-period).

In this manner, the actual hot-water supply amount measured before a given time point is held as estimation-reference data. Then, a future hot-water supply amount over a given time-period after a given time point is estimated by the neural network model 320 using the estimation reference data as an input value, and an actual hot-water supply amount in the same time zone as that of the estimated hot-water supply amount is measured and held as learning-control reference data. A learning control is then performed for the neural network model 320 in accordance with the held leaning-control reference data and the corresponding estimated hot-water supply amount. Thus, a hot-water supply amount to be varied between homes can be estimated with a higher degree of accuracy.

Based on the above configuration, the respective operations of the neuro-model-based estimation section 242, the neuro model learning-control section 243, the estimation-reference-data holding section 244 and the learning-control-reference-data holding section 245 are performed as with the power-consumption estimation section 200. As a result, an estimated hot-water supply amount of a 24-hour time-period after the time point of the estimation is sent from the neuro-model-based estimation section 242 to the power-generation instruction section 220.

The power-generation instruction section 220 adjusts the output power in accordance with the estimated power-consumption value and the estimated hot-water supply amount, so as to allow the fuel-cell power generator 100 to be efficiently operated.

Figure 11A:
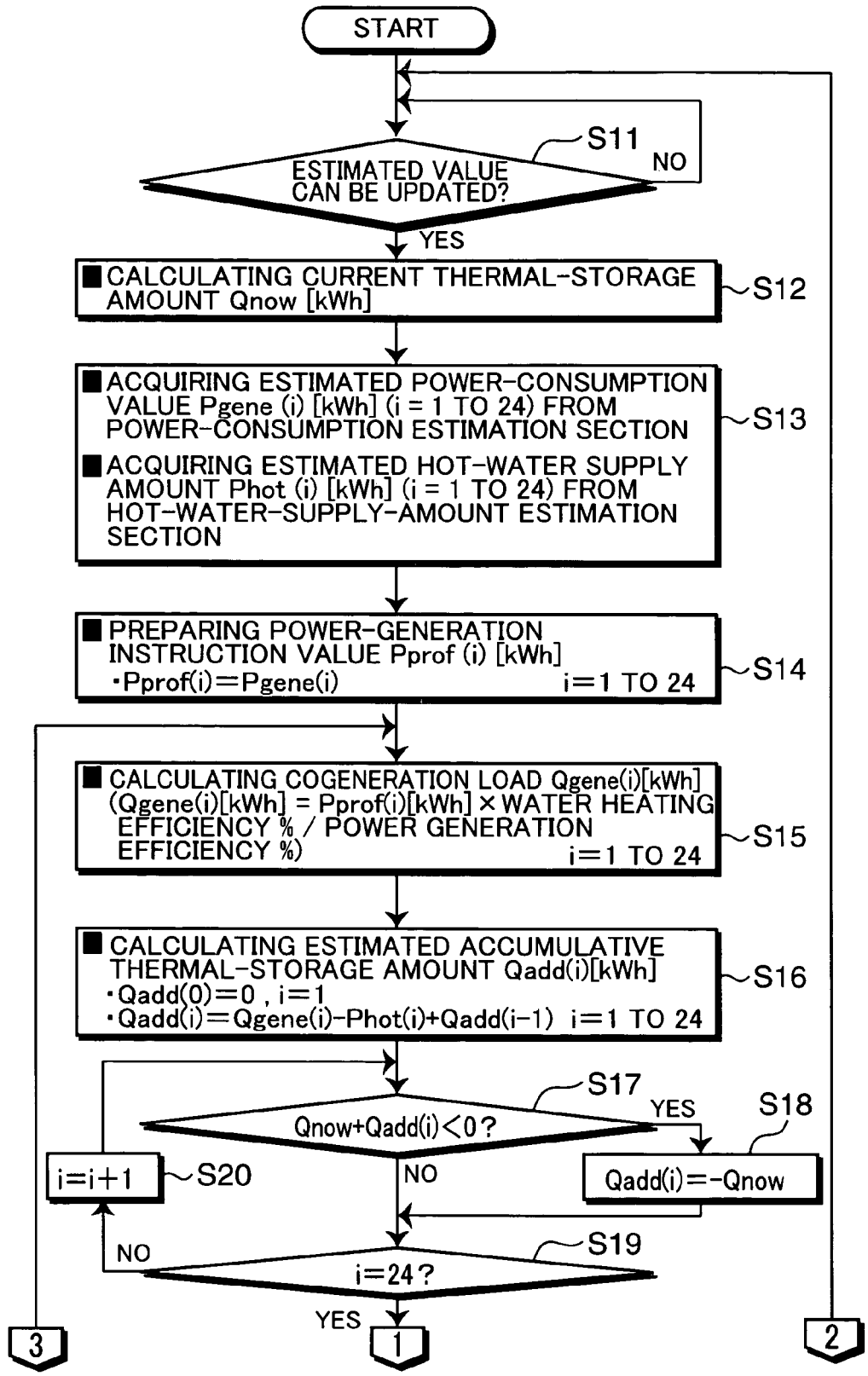
FIGS. 11A and 11B are explanatory operational flowcharts of a power-generation instruction section in FIG. 8.
Figure 11B:
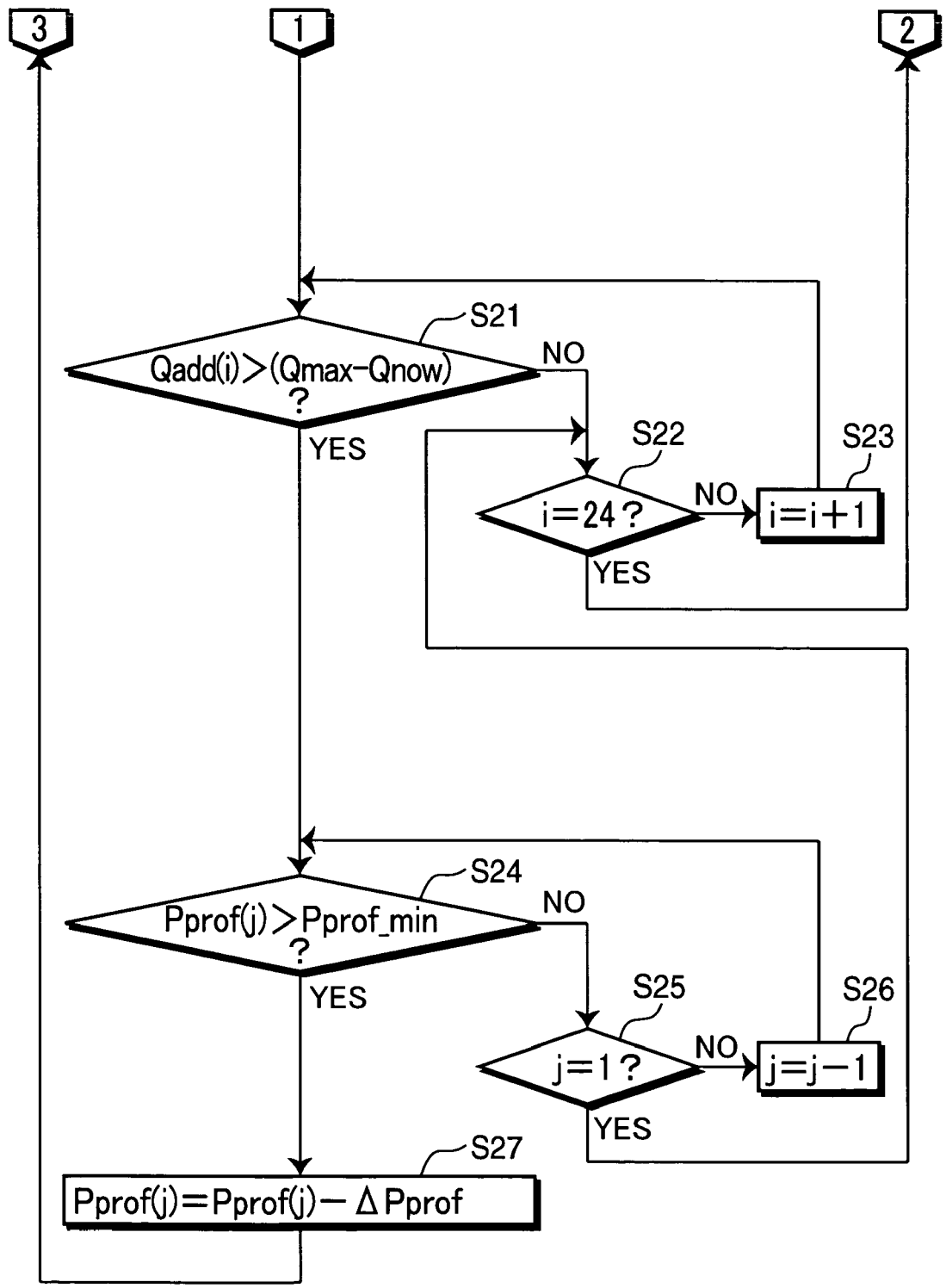

The operation of the power-generation instruction section 220 will be described below. FIGS. 11A and 11B are explanatory operational flowcharts of the power-generation instruction section 220 in FIG. 8. This embodiment is configured to perform the estimation in units of one hour. Thus, in response to update of the unit hour, it is determined whether the estimated value can be updated (Step S 11). If it is determined that the estimated value cannot be updated (NO in Step S11), the processing of Step S11 will be repeated. When it is determined that the estimated value can be updated (YES in Step S11), a current thermal-storage amount Qnow [kWh] is acquired from the hot-water storage tank 106 (Step S12). Typically, the current thermal-storage amount Qnow [kWh] may be determined by measuring a temperature distribution of hot water remaining in the hot-water storage tank 106 using a temperature sensor attached to the hot-water storage tank 106.

Then, the estimated power-consumption value Pgene (i) [kWh] (i=1 to 24) and the estimated hot-water supply amount Phot (i) [kWh] (i=1 to 24) are acquired for the next 24 hours in the unit of one hour, from the power-consumption estimation section 200 and the hot-water-supply-amount estimation section 240, respectively (Step S13). Then, process advances to a step of calculating an output-power instruction value Pprof (i) [kWh]. The estimated power-consumption value Pgene (i) [kWh] is first set as an initial value of the power-generation instruction value Pprof (i) [kWh] (Step S14). The operational state according to this setting is equivalent to the case that an electricity-based operation is completely performed for 24 hours. Then, a cogeneration load Qgene (i) [kWh] is calculated, which is the amount of heat to be generated in conjunction with the power generation of the fuel-cell power generator 100 in response to the power-generation instruction value Pprof (i) [kWh]. Specifically, the cogeneration load Qgene (i) [kWh] is calculated using the following formula (1) (Step S15):

$$Q\text{gene}(i)[\text{kWh}]=P\text{prof}(i)[\text{kWh}]\times(\text{Water heating efficiency [\%]/Power generation efficiency [\%]}) \qquad (1)$$

Then, an estimated accumulative thermal-storage amount Qadd (i) [kWh], which is a heat amount to be estimated at the current hour and to be added to or taken from the storage tank over a 24-hour time-period after the current hour, is calculated in accordance with the cogeneration load Qgene (i) [kWh] and the estimated hot-water supply amount Phot (i) [kWh], using the following formula (2) (Step S16):

$$Q\text{add}(i)=Q\text{gene}(i)-\text{Phot}(i)+Q\text{add}(i-1) \qquad (2)$$

Then, it is determined whether the sum of the current thermal-storage amount Qnow [kWh] and the estimated accumulative thermal-storage amount Qadd (i) [kWh] is less than 0 (zero), as shown in the following formula (3) (Step S17). This is intended to prevent the estimated thermal-storage amount (Qnow+Qadd (i)) in the storage tank from becoming negative due to the error in the estimated power-consumption value Pgene (i) [kWh] and the estimated hot-water supply amount Phot (i) [kWh]. If it is determined that the sum of the current thermal-storage amount Qnow [kWh] and the estimated accumulative thermal-storage amount Qadd (i) [kWh] is 0 (zero) or more (NO in Step S17), the process will advance to Step S19. When it is determined that the sum of the current thermal-storage amount Qnow [kWh] and the estimated accumulative thermal-storage amount Qadd (i) [kWh] is less than 0 (YES in Step S17), the estimated accumulative thermal-storage amount Qadd (i) [kWh] is defined by the following formula (4) (Step S18).

$$Q\text{now}+Q\text{add}(i)<0 \qquad (3)$$

$$Q\text{add}(i)=-Q\text{now} \qquad (4)$$

Then, the power-generation instruction section 220 repeatedly performs the determination of whether the sum of the current thermal-storage amount Qnow [kWh] and the estimated accumulative thermal-storage amount Qadd (i) [kWh] is less than 0, until i=24 (Steps S19 and S20)

Then, an hour i when the estimated accumulative thermal-storage amount Qadd (i) [kWh] is greater than a allowable thermal-storage amount (Qmax−Qnow) is calculated (Steps S21, S22 and S23), wherein Qmax [kWh] is a maximum allowable thermal-storage amount which is a fixed value determined by the size of the hot-water storage tank 106. The situation where the estimated accumulative thermal-storage amount Qadd (i) [kWh] becomes greater than an allowable thermal-storage amount (Qmax−Qnow) means that the hot-water storage tank 106 overfills at the hour i. In other words, the power-generation instruction section 220 determines whether the estimated accumulative thermal-storage amount Qadd (i) [kWh] is greater than a value (allowable thermal-storage amount) derived by subtracting the current thermal-storage amount Qnow from the maximum allowable thermal-storage amount Qmax. If the estimated accumulative thermal-storage amount Qadd (i) is greater than the allowable thermal-storage amount (Qmax−Qnow) (YES in Step S21), the process will advance to Step S24. When the estimated accumulative thermal-storage amount Qadd (i) is equal to or less than the allowable thermal-storage amount (Qmax−Qnow) (NO in Step S21), it is determined whether i is 24. When i is not 24 (NO in Step S22), i is incremented by 1 (Step S23), and then the process returns to Step S21.

In the above process, when there is at least one hour i when the estimated accumulative thermal-storage amount Qadd (i) is greater than a allowable thermal-storage amount (Qmax−Qnow), the power-generation instruction value Pprof (i) [kWh] is corrected using the following formula (5) (Steps S24, S25 and S26). After the correction, the process returns to Step S15. If there is not any hour i when the estimated accumulative thermal-storage amount Qadd (i) is greater than a allowable thermal-storage amount (Qmax−Qnow), the process will return to Step 11 to wait the next update of the unit hour.

$$Pprof(j)=Pprof(j)-\Delta Pprof \quad (5)$$

In the formula (5), j=i, and ΔPprof is an offset for correcting the power-generation instruction value Pprof (i) [kWh]. Typically, ΔPprof is set at a sufficiently small value (fixed value).

The power-generation instruction value Pprof (i) [kWh] corrected through the above series of operations to finally have a value allowing the hot-water storage tank 106 to avoid overfilling is sent to the fuel-cell power generator 100. Thus, the fuel-cell power generator 100 generates electricity in such a manner that the output power matches with power-generation instruction value Pprof (i) [kWh] from the power-generation instruction section 220.

Figure 12:
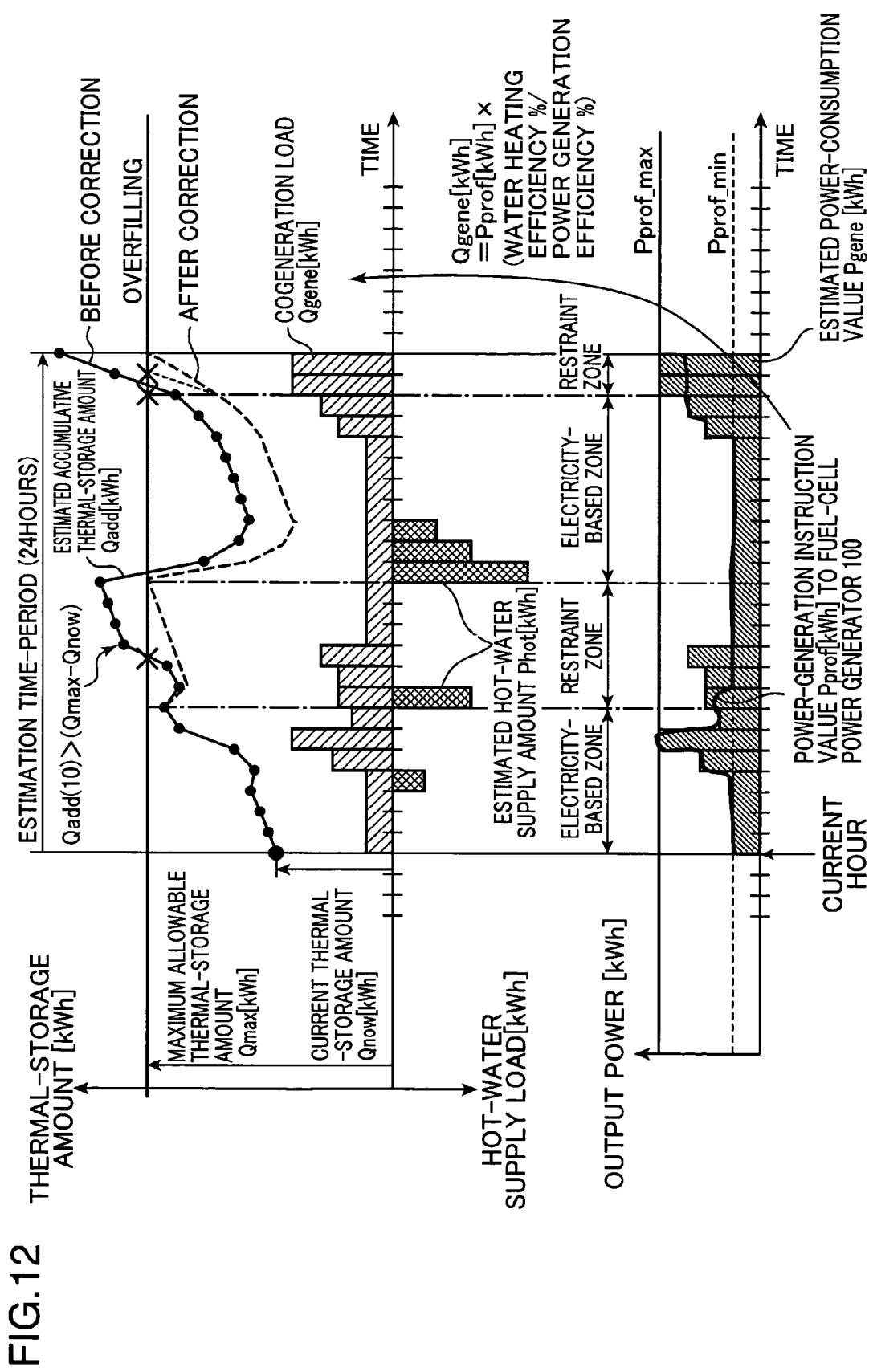
FIG. 12 is an explanatory diagram of one example of the relationship between an output power and a hot-water storage amount in the fuel-cell power generation system.

FIG. 12 is an explanatory diagram of one example of the relationship between an output power and a hot-water storage amount in the fuel-cell power generation system. More specifically, FIG. 12 shows the relationships between an estimated power-consumption value Pgene (i) [kWh] at the current hour, an estimated hot-water supply amount Phot (i) [kWh], a power-generation instruction value Pprof (i) [kWh], a cogeneration load Qgene (i) [kWh], an estimated accumulative thermal-storage amount Qadd (i) [kWh], a current thermal-storage amount Qnow [kWh] and a maximum allowable thermal-storage amount Qmax[kWh].

If the fuel-cell power generator 100 is controlled by an operation under the condition that the power-generation instruction value Pprof (i) [kWh] is equal to the estimated power-consumption value Pgene (i) [kWh], so-called an electricity-demand-based operation, the estimated accumulative thermal-storage amount Qadd (i) [kWh], e.g. in Qadd (10) after 10 hours, will become greater than the maximum allowable thermal-storage amount Qmax [kWh] of the hot-water storage tank 106, as indicated by "before correction". Thus, it is required to stop the fuel-cell power generator 100 or release a part of heat from the tank, resulting in increased loss. In this case, the above Steps S11 to S27 can be repeated to correct the power-generation instruction value Pprof (i) [kWh] so as to allow the estimated accumulative thermal-storage amount Qadd (i) [kWh] to be finally corrected to the state indicated by "after correction" and prevented from becoming greater than the maximum allowable thermal-storage amount Qmax [kWh]. In addition, the operations of Steps S11 to S27 are performed with respect to each of hours, so that the estimated accumulative thermal-storage amount Qadd (i) [kWh] can be maintained less than the maximum allowable thermal-storage amount Qmax [kWh] for 24 hours. Thus, the fuel-cell power generator 100 can be efficiently operated while suppressing loses due to stop of the operation or release of a part of heat from the tank.

According to the second embodiment of the present invention, based on the estimated power-consumption value from the power-consumption estimation section 200 and the estimated hot-water supply amount from the hot-water-supply-amount estimation section 240, the power-generation instruction section 220 can obtain a desirable power-generation instruction value capable of preventing overfilling of hot water in the hot-water storage tank 106. Thus, even in various homes where electricity and/or hot-water supply are used under different conditions, the fuel-cell power generator 100 can be operated while assuring a desired energy saving performance.

Further, an actual power-consumption value of a household appliance and an actual hot-water supply amount of a hot-water appliance are measured, and future power-consumption and hot-water supply amount over a given time-period after a given time point are estimated in accordance with the measured power-consumption value and hot-water supply amount. Then, the output power of the fuel-cell power generator 100 is adjusted in accordance with the estimated power-consumption value and hot-water supply amount. Thus, the power consumption and hot-water supply amount to be varied between homes can be estimated to efficiently control the output power of the fuel-cell power generator 100 so as to prevent overfilling of hot water in the storage tank 106. This makes it possible to eliminate the need for releasing a part of heat from the storage tank 106, and/or completely stopping/restarting the fuel-cell power generator 100 which causes startup losses, so as to achieve an evenhanded energy saving performance.

Furthermore, an accumulative hot-water storage amount to be accumulated from a current hot-water storage amount is estimated in accordance with the estimated power-consumption value and the estimated hot-water supply amount. Then, when the estimated accumulative hot-water storage amount is greater than a predetermined maximum allowable hot-water storage amount, a correction operation of slightly reducing the estimated power-consumption value is performed, and an accumulative hot-water storage amount to be accumulated from a current hot-water storage amount is further estimated in accordance with the corrected estimated power-consumption value and the estimated hot-water supply amount. Then, when the further estimated accumulative hot-water storage amount becomes less than the predetermined maximum allowable hot-water storage amount, the operation of the fuel-cell power generator 100 is controlled in accordance with the corrected estimated power-consumption value used in the last correction operation provided the further estimated accumulative hot-water storage amount. Thus, a desirable energy saving performance can be achieved by adjusting the output power without completely stopping the fuel-cell power generator 100.

While the fuel-cell power generation system 2 in the aforementioned embodiments incorporates the power meter 103 and/or the hot-water-supply load meter 109 therein, the present invention is not limited to such a structure, but it may be constructed such that the power meter 103 and/or the hot-water-supply load meter 109 are disposed outside the system 2, and required data are acquired therefrom to obtain the same effects.

Further, while the aforementioned embodiment is configured to adjust the power-generation instruction value while maintaining the operation of the fuel-cell power generator 100 without stopping the fuel-cell power generator 100 so as to prevent overfilling of hot water in the storage tank, the present invention is not limited to such a configuration. For example, the power-generation instruction section 220 may be configured to estimate an accumulative hot-water storage amount to be accumulated from a current hot-water storage amount, in accordance with the estimated power-consumption value from the power-consumption estimation section 200 and the estimated hot-water supply amount from the hot-water-supply-amount estimation section 240. When the estimated accumulative hot-water storage amount is greater than a predetermined maximum allowable hot-water storage amount, and the estimated power-consumption value provided from the power-consumption estimation section 200 is less than a given lower limit successively for a given time-period, a stop operation of the fuel-cell power generator 100 is initiated at the time point when the estimated accumulative hot-water storage amount will become greater than the predetermined maximum allowable hot-water storage amount.

Further, the power-generation instruction section 220 may be configured to estimate an accumulative hot-water storage amount to be accumulated from a current hot-water storage amount, in accordance with the estimated power-consumption value from the power-consumption estimation section 200 and the estimated hot-water supply amount from the hot-water-supply-amount estimation section 240. When the estimated accumulative hot-water storage amount is greater than a predetermined maximum allowable hot-water storage amount, and the estimated power-consumption value provided from the power-consumption estimation section 200 is greater than a given lower limit successively for a given time-period, the startup operation of the fuel-cell power generator 100 will be initiated at a time point going back from the time point when the estimated power-consumption value initially becomes greater than the given lower limit, by a time-period necessary for the activation of the fuel-cell power generator. In these cases, while some startup loss occurred due to restarts in connection with the stop operation of the fuel-cell power generator 100, the above control can minimize unnecessary power generation to provide a desirable energy saving performance.

The fuel-cell power generation system and its control method of the present invention can be used in various power generation apparatuses, such as motor means including engines. Further, in addition to the control of electricity, the present invention can be used to control the amount of hot water or the like.

Advantageous embodiments of the invention have been shown and described. It is obvious to those skilled in the art that various changes and modifications may be made therein without departing from the spirit and scope thereof as set forth in appended claims.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A fuel-cell power generation system including a fuel-cell power generator adapted to generate electricity to be supplied to an electrical appliance, said system comprising:
    power measurement means for measuring an actual power-consumption value in the appliance;
    power-consumption estimation means for estimating a future power-consumption value over a time-period after a point in time according to a neural network model using, as an input value, the actual power consumption value before the point in time, measured by said power measurement means; and
    operation control means for initiating a start-up operation of the fuel-cell power generator at a point in time before the estimated future power-consumption value initially becomes greater than a lower limit of output power of the fuel-cell power generator, by a time period necessary to activate the fuel-cell power generator, when the estimated future power consumption value estimated by said power-consumption estimation means is successively greater than the lower limit of output power for a given time period.

2. The fuel-cell power generation system as defined in claim 1, wherein said power-consumption estimation means includes:
    estimation-reference-data holding means for holding the actual power-consumption value measured before the point in time, as estimation reference data;
    neuro-model-based estimation means for estimating the future power-consumption value over the time-period after the point in time, wherein the neural network model is included in said neuro-model-based-estimation means and uses the estimation reference data as the input value;
    learning-control-reference-data holding means for holding an actual power-consumption value measured by said power measurement means in a same time period as that of the estimated future power-consumption value, as learning-control reference data; and
    neuro-model learning-control means for correcting a weighting factor of the neural network model by minimizing a difference between the learning-control reference data and the estimated future power-consumption value estimated by the neuro-model-based estimation means.

3. The fuel-cell power generation system as defined in claim 1,
    wherein said operation control means is operable to, when the estimated future power-consumption value provided from said power-consumption estimation means is successively less than the lower limit of output power for a given time-period, initiate a stop operation of the fuel-cell power generator at a point in time when the estimated future power-consumption value initially becomes less than the lower limit of output power.

4. The fuel-cell power generation system as defined in claim 1, wherein said power measurement means is operable to, when the actual power-consumption value in the electrical appliance is greater than an upper limit of the output power of the fuel-cell power generator, measure the upper limit as a substitute for the actual power-consumption value.

5. The fuel-cell power generation system as defined in claim 1, further comprising:
    hot-water-supply measurement means for measuring an actual hot-water supply amount from a hot-water appliance adapted to supply hot water using the fuel-cell power generator; and
    hot-water-supply-amount estimation means for estimating a future hot-water supply amount over a hot-water time-period after a hot-water point in time, in accordance with the actual hot-water supply amount,
    wherein said operation control means is operable to control the operation of the fuel-cell power generator in accordance with the estimated future power-consumption value and the estimated future hot-water supply amount.

6. The fuel-cell power generation system as defined in claim 5, wherein said hot-water-supply-amount estimation means includes:

estimation-reference-data holding means for holding the actual hot-water supply amount measured before the hot-water point in time, as estimation reference data;

neuro-model-based estimation means for estimating the future hot-water supply amount over the hot-water time period after the hot-water point in time, according to a neural network model using the estimation reference data as an input value;

learning-control-reference-data holding means for holding an actual hot-water supply amount measured by said hot-water-supply measurement means in a same time period as that of the estimated future hot-water supply amount, as learning-control reference data; and neuro-model learning-control means for learning-controlling the neural network model in accordance with the learning-control reference data and the estimated future hot-water supply amount.

7. The fuel-cell power generation system as defined in claim 5,
wherein said operation control means is operable to
estimate an accumulative hot-water storage amount to be accumulated from a current hot-water storage amount, in accordance with the estimated future power-consumption value from said power-consumption estimation means and the estimated future hot-water supply amount from said hot-water-supply-amount estimation means, and
adjust the output power of the fuel-cell power generator to prevent the estimated accumulative hot-water storage amount from becoming greater than a predetermined maximum allowable hot-water storage amount.

8. The fuel-cell power generation system as defined in claim 5,
wherein said operation control means is operable to estimate an accumulative hot-water storage amount to be accumulated from a current hot-water storage amount, in accordance with the estimated future power-consumption value from said power-consumption estimation means and the estimated future hot-water supply amount from said hot-water-supply-amount estimation means, and
wherein when the estimated accumulative hot-water storage amount is greater than a predetermined maximum allowable hot-water storage amount, said operation control means is operable to perform a correction operation of reducing the estimated future power-consumption value, and further estimating an accumulative hot-water storage amount to be accumulated from the current hot-water storage amount, in accordance with the corrected estimated future power-consumption value and the estimated future hot-water supply amount.

9. The fuel-cell power generation system as defined in claim 5,
wherein said operation control means is operable to estimate an accumulative hot-water storage amount to be accumulated from a current hot-water storage amount, in accordance with the estimated future power-consumption value from said power-consumption estimation means and the estimated future hot-water supply amount from said hot-water-supply-amount estimation means, and
wherein when the estimated accumulative hot-water storage amount is greater than a predetermined maximum allowable hot-water storage amount, and the estimated future power-consumption value provided from said power-consumption estimation means is successively less than the lower limit of the output power for a predetermined time-period, said operation control means is operable to initiate a stop operation of the fuel-cell power generator at a point in time when the estimated accumulative hot-water storage amount becomes greater than the predetermined maximum allowable hot-water storage amount.

10. The fuel-cell power generation system as defined in claim 5,
wherein said operation control means is operable to estimate an accumulative hot-water storage amount to be accumulated from a current hot-water storage amount, in accordance with the estimated future power-consumption value from said power-consumption estimation means and the estimated future hot-water supply amount from said hot-water-supply-amount estimation means, and
wherein when the estimated accumulative hot-water storage amount is greater than a predetermined maximum allowable hot-water storage amount, and the estimated future power-consumption value provided from said power-consumption estimation means is successively greater than the lower limit of output power for a predetermined time-period, said operation control means is operable to initiate a startup operation of the fuel-cell power generator at a point in time before the estimated future power-consumption value initially becomes greater than the lower limit of output power, by a time-period necessary to activate the fuel-cell power generator.

11. A method for controlling a fuel-cell power generation system which includes a fuel-cell power generator adapted to generate electricity to be supplied to an electrical appliance, said method comprising:
measuring an actual power-consumption value in the appliance;
estimating a future power-consumption value over a time-period after a point in time according to a neural network model using, as an input value, the actual power-consumption value before the point in time; and
initiating a start-up operation of the fuel-cell power generator at a point in time before the estimated future power-consumption value initially becomes greater than a lower limit of output power of the fuel-cell power generator, by a time period necessary to activate the fuel-cell power generator, when the estimated future power-consumption value estimated in said estimating operation is successively greater than the lower limit of output power for a given time period.

12. The method as defined in claim 11, further comprising:
measuring an actual hot-water supply amount from a hot-water appliance adapted to supply hot water using the fuel-cell power generator; and
estimating a future hot-water supply amount over a hot-water time-period after a hot-water point in time in accordance with the actual hot-water supply amount,
wherein said initiating operation includes controlling operation of the fuel-cell power generator in accordance with the estimated future power-consumption value obtained in said estimating a future power consumption operation and the estimated future hot-water supply amount obtained in said estimating a future hot-water-supply-amount operation.

* * * * *